US011532811B2

(12) United States Patent
Kanno et al.

(10) Patent No.: US 11,532,811 B2
(45) Date of Patent: Dec. 20, 2022

(54) COMPOSITE MATERIAL, ELECTRODE, ELECTRODE DEVICE, POWER STORAGE DEVICE AND METHOD OF MANUFACTURING COMPOSITE MATERIAL

(71) Applicants: Yusuke Kanno, Kanagawa (JP); Hideo Yanagita, Tokyo (JP); Satoshi Nakajima, Tokyo (JP); Eiko Suzuki, Kanagawa (JP); Anna Hirowatari, Kanagawa (JP)

(72) Inventors: Yusuke Kanno, Kanagawa (JP); Hideo Yanagita, Tokyo (JP); Satoshi Nakajima, Tokyo (JP); Eiko Suzuki, Kanagawa (JP); Anna Hirowatari, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 134 days.

(21) Appl. No.: 16/814,299

(22) Filed: Mar. 10, 2020

(65) Prior Publication Data
US 2020/0295355 A1 Sep. 17, 2020

(30) Foreign Application Priority Data

Mar. 12, 2019 (JP) ............................. JP2019-045259
Mar. 12, 2019 (JP) ............................. JP2019-045260

(51) Int. Cl.
| | | |
|---|---|---|
| *H01M 4/36* | (2006.01) | |
| *C01B 25/45* | (2006.01) | |
| *H01M 4/136* | (2010.01) | |
| *H01M 4/58* | (2010.01) | |
| *H01M 4/62* | (2006.01) | |
| *H01M 4/02* | (2006.01) | |

(52) U.S. Cl.
CPC ............. *H01M 4/362* (2013.01); *C01B 25/45* (2013.01); *H01M 4/136* (2013.01); *H01M 4/5825* (2013.01); *H01M 4/625* (2013.01); *C01P 2004/64* (2013.01); *C01P 2006/10* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| 8,802,293 B2 | 8/2014 | Takimoto et al. |
| 9,111,684 B2 | 8/2015 | Onagi et al. |
| 9,437,866 B2 | 9/2016 | Kikuchi et al. |

(Continued)

FOREIGN PATENT DOCUMENTS

| JP | 2001-106636 | 4/2001 |
| JP | 2010-003593 | 1/2010 |

(Continued)

OTHER PUBLICATIONS

Japanese Office Action for 2019-166136 dated Feb. 25, 2020.

(Continued)

*Primary Examiner* — Daniel S Gatewood
(74) *Attorney, Agent, or Firm* — IPUSA, PLLC

(57) ABSTRACT

A composite material includes vanadium lithium phosphate, and a conductive carbon. an amount of the conductive carbon is 2.5 mass % or more and 7.5 mass % or less.

19 Claims, 9 Drawing Sheets

(56) References Cited

U.S. PATENT DOCUMENTS

| | | | |
|---|---|---|---|
| 9,754,726 | B2 | 9/2017 | Onagi et al. |
| 9,831,521 | B2 | 11/2017 | Kimura et al. |
| 10,090,554 | B2 | 10/2018 | Yanagita et al. |
| 2008/0305256 | A1* | 12/2008 | Kimble ............... H01M 4/5825 427/215 |
| 2012/0308893 | A1* | 12/2012 | Fujino .................... C01B 25/37 429/221 |
| 2013/0084500 | A1* | 4/2013 | Takimoto .......... H01M 10/0525 429/220 |
| 2013/0214462 | A1* | 8/2013 | Kikuchi .............. H01M 4/1397 264/620 |
| 2015/0303513 | A1 | 10/2015 | Hirowatari et al. |
| 2016/0260972 | A1 | 9/2016 | Hibino et al. |
| 2018/0261827 | A1 | 9/2018 | Yanagita et al. |
| 2018/0366729 | A1 | 12/2018 | Yanagita et al. |
| 2019/0288259 | A1 | 9/2019 | Ohkimoto et al. |
| 2019/0288276 | A1 | 9/2019 | Utsuki et al. |

FOREIGN PATENT DOCUMENTS

| | | | |
|---|---|---|---|
| JP | 2010-218829 | | 9/2010 |
| JP | 2012-036048 | | 2/2012 |
| JP | 2012-036049 | | 2/2012 |
| JP | 2012-036050 | | 2/2012 |
| JP | 2012036048 | A * | 2/2012 |
| JP | 2013-077377 | | 4/2013 |
| JP | 5255138 | | 8/2013 |
| JP | 5255143 | | 8/2013 |
| JP | 5309264 | | 10/2013 |
| JP | 2019-164986 | | 9/2019 |
| JP | 2019-166136 | | 10/2019 |
| WO | 2011/102358 | | 8/2011 |
| WO | 2012/043367 | | 4/2012 |

OTHER PUBLICATIONS

Office Action dated Jul. 7, 2020 issued with respect to the corresponding Japanese Patent Application No. 2019-166136.
European Extended Search Report for EP20162378.2 dated May 27, 2020.
Chang C et al: "Hydrothermal synthesis of carbon-coated lithium vanadium phosphate", Electrochimica Acta, Elsevier, Amsterdam, NL, vol. 54, No. 2, Dec. 30, 2008 (Dec. 30, 2008), pp. 623-627, XP025536159, ISSN: 0013-4686, DOI: 10.1016/J.ELECTACTA. 2008.07.038 [retrieved on Jul. 25, 2008] * the whole document *.
Quan Kuang et al: "Two-step carbon coating of lithium vanadium phosphate as high-rate cathode for lithium-ion batteries", Journal of Power Sources, Elsevier SA, CH, vol. 216, Apr. 26, 2012 (Apr. 26, 2012), pp. 33-35, XP028411849, ISSN: 0378-7753, DOI: 10 1016/ J.JPOWSOUR.2012.04.078 [retrieved on May 27, 2012] *the whole document *.
Japanese Office Action for 2019-045260 dated Oct. 4, 2022.
Japanese Office Action for 2019-045259 dated Oct. 11, 2022.

* cited by examiner

COMPOSITE MATERIAL, ELECTRODE, ELECTRODE DEVICE, POWER STORAGE DEVICE AND METHOD OF MANUFACTURING COMPOSITE MATERIAL

CROSS-REFERENCE TO RELATED APPLICATION

The present application is based on and claims priority to Japanese Priority Application No. 2019-045259 filed on Mar. 12, 2019, and Japanese Priority Application No. 2019-045260 filed on Mar. 12, 2019, the entire contents of which are hereby incorporated herein by reference.

BACKGROUND OF THE INVENTION

1. Field of the Invention

The present invention relates to a composite material, an electrode, an electrode device, a storage device and a method of manufacturing a composite material.

2. Description of the Related Art

Electrode materials using cobalt are known as the electrode materials of power storage devices. In such electrode materials, there is a need to minimize the use of cobalt due to a shortage of cobalt resources.

In the meantime, lithium vanadium phosphate is known as a cobalt-free electrode material with excellent safety and output performance. Applications of power storage devices using lithium vanadium phosphate as the electrode material include wearable devices, electrical equipment, power sources of electric vehicles (EVs, HEVs and the like) and the like due to their excellent safety and output performance.

For example, Japanese Patent No. 5309264 discloses an electrode material in which vanadium lithium phosphate is coated with conductive carbon in a range of 0.1 mass % to 20 mass % with respect to the total mass of vanadium lithium phosphate as a storage device using lithium vanadium phosphate as an electrode material.

In recent years, a battery device with a high degree of design freedom has been provided by dispersing the micronized battery material in an aqueous solvent or an organic solvent with a low solid concentration and printing it directly on a substrate by an ink jet method.

When vanadium lithium phosphate is used as the electrode material, a coating made of conductive carbon is required to compensate for the lack of conductivity of vanadium lithium phosphate. However, there is a problem of being incapable of forming a preferable conductive path and improving output performance if the amount of coating on vanadium lithium phosphate with the conductive carbon is small.

In contrast, if the amount of the coating of vanadium lithium phosphate with the conductive carbon is great, when vanadium lithium phosphate with the conductive carbon is converted to an application liquid, a liquid property degrades and a coating defect is generated.

SUMMARY OF THE INVENTION

Accordingly, embodiments of the present invention may provide a composite material, an electrode, an electrode device, a storage device and a method of manufacturing composite material reducing one or more of the above-described problems.

More specifically, the embodiments of the present invention may provide a composite material that includes vanadium lithium phosphate, and a conductive carbon. An amount of the conductive carbon is 2.5 mass % or more and 7.5 mass % or less.

Other objects, features and advantages of the present invention will become more apparent from the following detailed description when read in conjunction with the accompanying drawings.

DETAILED DESCRIPTION OF THE PREFERRED EMBODIMENTS

Figure 1:
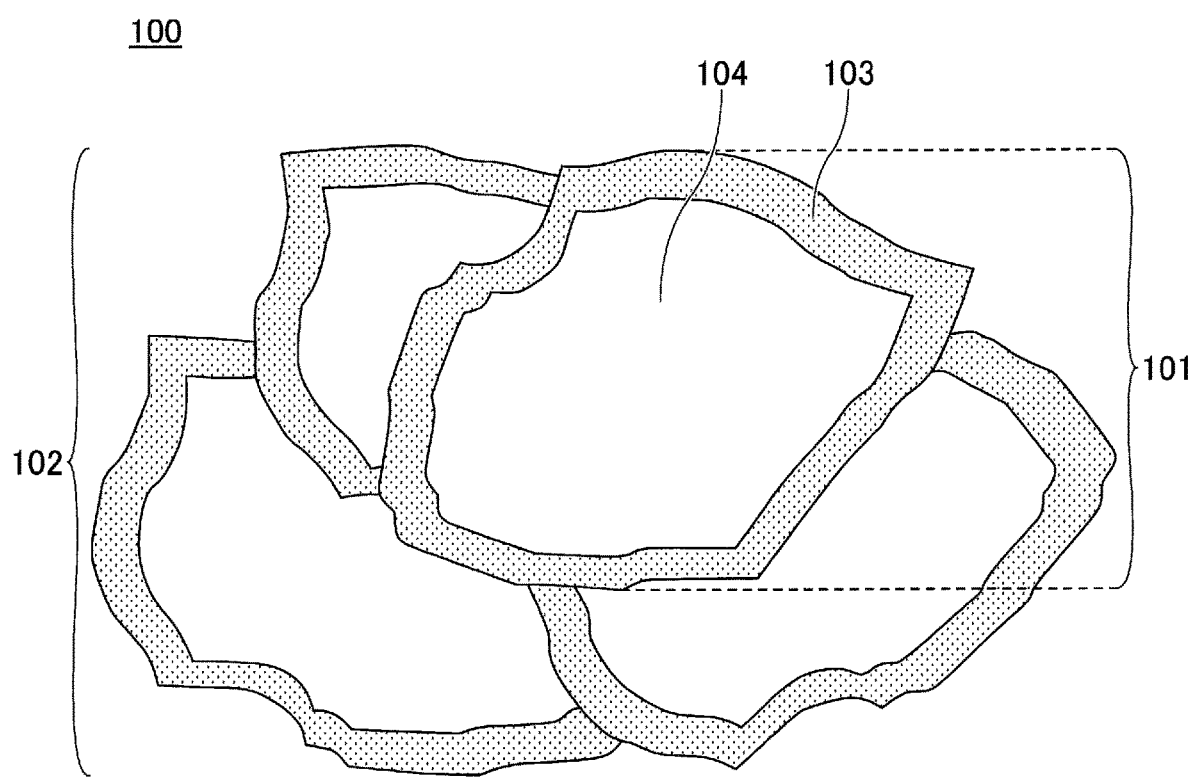
FIG. 1 is a cross-sectional view illustrating an example of a composite material according to the present embodiment.

Hereinafter, an embodiment for carrying out the invention with reference to the drawings will be described. In each drawing, the same components are indicated by the same reference numerals and overlapping descriptions may be omitted.

First Embodiment

FIG. 1 illustrates an example of a composite material according to the present embodiment.

<Composite Material>

The composite material 100 according to the present embodiment is a composite material containing lithium vanadium phosphate and electrically conductive carbon, and the amount of conductive carbon is in the range of 2.5 mass % to 7.5 mass %.

When vanadium lithium phosphate is used as the electrode material, a coating made of conductive carbon is required to compensate for the lack of conductivity of vanadium lithium phosphate. However, if the amount of coating on vanadium lithium phosphate with the conductive carbon is small, a preferable conductive path cannot be formed, and the output performance cannot be improved. In contrast, if the amount of coating on vanadium lithium phosphate with the conductive carbon is great, when vanadium lithium phosphate with the conductive carbon is converted into an application liquid, the liquid state deteriorates and a coating defect is generated. The present disclosure is based on the findings.

The composite material 100 according to the present embodiment is classified as a primary material 101, which is an aggregate of crystallites, and a secondary material 102, which is an aggregate of the primary material 101.

The shape of the primary material 101 and the secondary material 102 are not particularly limited, and include, for example, a bulk shape, a rod shape, a plate shape, a disk shape, a grain shape, and the like. In particular, the shape of the primary material 101 and the secondary material 102 are preferably formed into a grain shape in order to have excellent handling performance, high density, and excellent processability such as liquid discharge properties.

By granulating the primary material 101 to form the secondary material 102, the handleability when making the electrodes can be improved.

On the surface of the primary material 101 that constitutes the secondary material 102, there is a covering layer of conductive carbon 103, and the covering layer of conductive carbon 103 maintains the conductivity of the secondary material 102.

However, if the coating layer of the conductive carbon 103 on the surface of the primary material 101 is too thick, the specific surface area of the secondary material 102 will increase. If the specific surface area of the secondary material 102 is increased, the thixotropy property is increased when a liquid such as an application liquid containing the composite material 100 is produced, which causes deterioration of the liquid property, a decrease in density of the electrode layer due to the bulking of the particles, and a consequent decrease in energy density of the power storage device.

The composite material 100 in accordance with the present embodiment contains vanadium lithium phosphate 104 and electrically conductive carbon 103.

Lithium vanadium phosphate 104 of the composite material 100 according to the present embodiment is a compound represented by the chemical formula $Li_3V_2(PO_4)_3$, or the general formula $Li_xV_2-yM_y(PO_4)z$ (x, y and z satisfies $0<x\leq3$, $0\leq y<2$, or $2\leq z\leq3$, and M is at least one selected from the group consisting of Fe, Co, Mn, Cu, Zn, Al, Sn, B, Ga, V, Ti, Mg, Ca, Sr, Zr, Nb, Y, Na, and W), among which $Li_3V_2(PO_4)_3$ is preferred because it is unlikely to decompose in the electrolytic solution when used in the power storage device.

The amount of coating on the composite material 100 according to the present embodiment is preferably in the range of 2.5 mass % to 7.5 mass % with respect to the total amount of the composite material 100.

If the coating amount on the composite material 100 by the conductive carbon 103 is less than 2.5 mass %, the powder resistance of the composite material 100 increases and the output performance of the power storage device decreases. Further, if the coating amount on the composite material 100 by the conductive carbon 103 is greater than 7.5 mass %, the specific surface area of the composite material 100 increases, and when the liquid such as an application liquid containing the composite material is produced, the liquid conditions degrade, and a coating defect is generated.

The coating amount of the conductive carbon 103 on the composite material 100 can be measured, for example, by a solid sample combustion device (SSM-5000A, Shimadzu Corporation) and a total organic carbon meter (TOC-VCSH, Shimadzu Corporation).

Preferably, the true density of the composite material 100 in accordance with the present embodiment is not less than 2.90 g·cm$^{-3}$.

When the true density of the composite material 100 is 2.90 g·cm$^{-3}$ or more, there is less cavities inside the composite material, resulting in better lithium ion diffusion and charge transfer and improved output performance of the power storage device.

Also, if the true density of the composite material 100 is higher than 3.20 g·cm$^{-3}$, impurities such as vanadium pentoxide present in the composite material 100 can cause a decomposition reaction of the electrolyte and dissolution precipitation, thereby reducing the reliability of the power storage device.

The true density of the composite material 100 can be measured, for example, by a gas pycnometer (ULTRAPYC 1200e, Quantachrome Instruments).

The crystallite size of the composite material 100 in accordance with the present embodiment is preferably 55 nm or less.

If the crystallite size of the composite material 100 is 55 nm or less, the output density of the power storage device can be improved.

The crystallite size of the composite material 100 can be analyzed and calculated by the Pawley method using, for example, an X-ray diffractometer (D8 DISCOVER, BrukerAXS) and an analysis software (TOPAS, BrukerAXS) from the diffraction line obtained in the range of 2θ=10 to 90 degrees.

The powder resistance of the composite material 100 in accordance with the present embodiment is preferably 100 Ωcm or less. If the powder resistance of the composite material 100 is 100 Ωcm or less, a good conductive path is formed in the composite material 100, and the output density of the power storage device improves. The powder resistance of the composite material 100 can be measured using, for example, a 1400 Celltest System (manufactured by Solatron Analytical) and a four-terminal sample holder (manufactured by Toyo Technica co. Ltd.).

The concentration of vanadium in the coating layer made of the conductive carbon 103 on the composite material 100 in accordance with the present embodiment is preferably 5 at % or less.

If the concentration of vanadium in the coating layer made of the conductive carbon 103 on the composite material 100 is 5 at % or less, the formation of a highly pure conductive carbon improves the output density of the power storage device.

Vanadium concentration in the coating layer made of the conductive carbon 103 on the composite material 100 can be measured by EDX analysis using JEM-2100F (HR) (JEOL Ltd.).

<Method of Manufacturing Composite Material>

Figure 2:
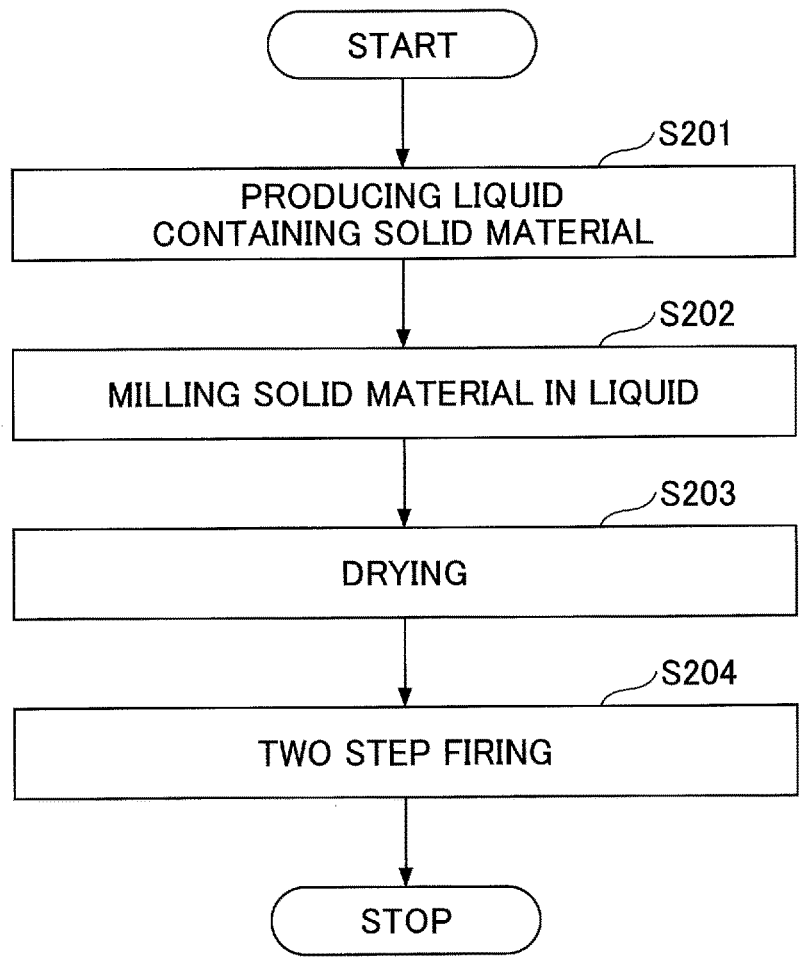
FIG. 2 is an example of a flowchart of a method of manufacturing a composite material according to the present embodiment.

FIG. 2 illustrates an example of a flowchart diagram of a method of manufacturing a composite material 100 according to the present embodiment.

A method of manufacturing a composite material 100 according to the present embodiment includes, for example, a manufacturing method comprising: a stirring process (S201) of adding a lithium source, a source of phosphate, a source of vanadium, a conductive carbon or a conductive carbon precursor to a solvent, and heating while stirring the solvent for 0.5 hours or more at 60° C. to 100° C.; a milling step (S202) for obtaining a milled object that is a slurry fluid by milling a solid material in a liquid, which is the product of the stirring process, in a wet condition using a media mill and the like to a median diameter of 0.2 to 1.0 μm; and a baking step (S204) for obtaining a composite material 100 by baking the milled object.

The solvent in the stirring process is not particularly limited as long as the solvent can dissolve a lithium source, a phosphate source, and a conductive carbon or a conductive carbon precursor. The solvent may be appropriately selected depending on the purpose, but the solvent is preferably an aqueous solvent having water as the main component in terms of solubility.

The lithium sources in the stirring process include lithium organic acids such as lithium carbonate, lithium hydroxide, lithium oxide, lithium nitrate or lithium oxalate, which may be hydrates or anhydrides.

Examples of the phosphate source in the stirring process include phosphoric acid, polyphosphoric acid, phosphoric anhydride, ammonium dihydrogen phosphate, diammonium hydrogen phosphate, and ammonium phosphate.

For example, a combination of lithium source and phosphate source is preferably lithium carbonate, which is a weak base, and phosphoric acid, which is a moderate acid. Lithium phosphate dissolves well by acidifying the aqueous solution.

Examples of the source of vanadium in the stirring process include vanadium pentoxide, ammonium vanadate, and vanadium oxyoxalate. Of these, vanadium pentoxide is preferred in that vanadium pentoxide provides a highly reactive composite precursor.

As the conductive carbon in the stirring process, a natural graphite, a graphite made of artificial graphite, a carbon black such as acetylene black, ketchen black, channel black, furnace black, lamp black, thermal black and the like, a carbon fiber, fluorocarbon, a graphene derivative and the like may be used.

Conductive carbon precursors in the stirring process include, for example, coal tar pitch from a soft pitch to a hard pitch; direct current heavy oil of coal-based heavy oil such as dry distillation liquid oil, atmospheric residual oil, decomposition heavy oil such as direct current heavy oil of depressurized residual oil, crude oil, ethylene tar and the like, which is produced as a by-product during pyrolysis of crude oil, naphtha and the like; aromatic hydrocarbons such as acenaphthylene, decacycline, anthracene, phenanthrene and the like; polyphenylene such as phenazine, biphenyl, biphenyl and the like; polyvinyl chloride; water-soluble polymers such as polyvinyl alcohol, polyvinyl butyral, polyethylene glycol and the like, and insolubilized treatments thereof; nitrogen-containing polyacrylonitriles; organic polymers such as polypyrrole; organic polymers such as sulfuric polythiophene, polystyrene and the like; natural polymers such as sugar and the like of glucose, fructose, lactose, maltose, sucrose and the like; thermoplastics such as polyphenylene sulfide and polyphenylene oxide, and thermosetting resins such as phenol-formaldehyde resins and imide resins. Among them, sugars are preferable because they are inexpensive and easy to handle.

In the stirring process, it is preferable that a lithium phosphate aqueous solution be prepared by adding a lithium source and a phosphoric acid source to a water-based solvent, followed by the addition of a vanadium source and a conductive carbon or a conductive carbon precursor.

After the lithium phosphate aqueous solution is prepared first, the vanadium source and the conductive carbon or the conductive carbon precursor are added to cause a mild reaction that reduces the exothermic reaction, thereby obtaining the high true density composite material 100.

The aqueous lithium phosphate solution in the stirring process may be prepared by dissolving a lithium source and a phosphate source in an aqueous solvent, or a commercially available aqueous lithium phosphate solution may be used.

That is, the stirring process may be a process of stirring a lithium source, a source of phosphoric acid, a source of vanadium, a conductive carbon or a conductive carbon precursor in a solvent, or a process of adding a source of vanadium, a conductive carbon or a conductive carbon precursor to an aqueous lithium phosphate solution and then stirring the solution.

The mixing ratio of the lithium source, the vanadium source, and the phosphate source in the stirring process may be adjusted to a composition represented by composition formula: $Li_3V_2(PO_4)_3$, that is, Li atom:V atom:P atom=3:2:3 (molar ratio).

The median diameter of the milled object in the milling process is preferably not more than 2.0 μm in order to obtain a composite precursor having excellent reactivity.

The median diameter of the milled object in the milling process can be measured by laser confusion/diffraction (Master Sizer 3000, manufactured by Malvarn Panalytical).

Although not required, a drying process (S203) for drying the milled object obtained in the milling process is provided.

Further, the drying processing in the drying process is not particularly limited as long as the moisture in the milled object can be removed, but drying by spray drying is preferable because the composite material can be uniformly coated with the conductive carbon or the conductive carbon precursor.

When spray drying is used in the drying process, the solid concentration of the milled object can be adjusted. By adjusting the solid concentration of the milled object, the degree of agglomeration of the primary particles and the associated inter-particle cavities after the agglomeration can be controlled.

Preferably, the solid concentration of the milled object is not less than 15 mass % and not more than 30 mass %, and more preferably, the solid concentration is not less than 20 mass % and not more than 25 mass %.

When the solid concentration of the milled object is greater than 30 mass %, many primary particles aggregate, and many interparticulate cavities increase, resulting in a decrease in true density. If the solid concentration of the milled object is 30 mass % or less, the decrease in true density can be further reduced.

If the solid concentration of the milled object is less than 15 mass %, the coating layer of the conductive carbon becomes too thick, and lithium ion diffusivity decreases, thereby degrading output performance. If the solid concentration of the milled object is 20 mass % or more, the coating layer made of the conductive carbon can be inhibited from being too thick, and the deterioration of the output performance can be further inhibited.

The baking in the baking process is preferably a two-stage baking in which pre-baking is performed at the first temperature and then baking is performed at the second temperature not less than the first temperature.

The pre-baking removes impurities such as moisture and organic matter in the material to obtain a composite material 100 coated with a highly pure conductive carbon.

The baking temperature of the pre-baking in the baking process is preferably not less than 100° C. and not more than 500° C.

The pre-baking temperature increase rate in the baking process is preferably from T/4 to 2 T° C.·h$^{-1}$ when T=the pre-baking temperature. The pre-baking temperature increase rate means the average rate from room temperature to the temperature of pre-baking.

When the rate of increase in temperature of the pre-baking exceeds 2T° C.·h$^{-1}$, the volatile component contained in the precursor of the composite material rapidly thermally expands. As a result, the coating layer made of the conductive carbon 103 for the composite material 100 becomes defective. The conductive carbon precursor melts when the pre-baking temperature increase rate is less than T/4° C.·h$^{-1}$. As a result, a coating layer made of a uniform conductive carbon 103 cannot be formed on the composite material 100.

The baking temperature in the baking process is preferably 600° C. or more and 1200° C. or less, and more preferably 1000° C. or less.

If the temperature is below 600° C., sufficient reaction energy cannot be obtained to form vanadium lithium phosphate. As a result, low-purity lithium vanadium phosphate is formed, which causes a decrease in output characteristics. In addition, because the conductive carbon precursor is not thermally decomposed, lithium vanadium phosphate is not sufficiently coated with the conductive carbon, which a decrease in output characteristics.

When the baking temperature is higher than 1200° C., the coating amount of the conductive carbon decreases, resulting in the generation of low purity vanadium lithium phosphate. As a result, the output characteristics decrease.

A baking temperature is more preferably 1000° C. or less in that the crystallite size of the composite material can be controlled to 55 nm or less.

The baking period of time in the baking process is preferably not less than 0.5 hours.

Both the pre-baking and the baking are preferably performed in an atmosphere of an inert gas, such as $N_2$ or Ar, or under vacuum. $O_2$ and $H_2O$ can be removed under an inert gas or vacuum to cause a mild reaction, and the formation of a by-product such as $LiVOPO_4$ can be inhibited. In terms of heating efficiency, the pre-baking and the baking under an inert gas is more preferred.

Thus, the composite material according to the present embodiment contains lithium vanadium phosphate and a conductive carbon, and the amount of conductive carbon is in a range of 2.5 mass % to 7.5 mass %. Thus, the composite material 100 having excellent electrical conductivity and excellent printing characteristics can be implemented when the composite material is made an application liquid.

The amount of conductive carbon can be controlled by adjusting the adding conditions of the conductive carbon or the conductive carbon precursor. For example, when sucrose is added as a conductive carbon precursor, if the mass ratio of the added sucrose to the total raw material mass is 4.0 mass % or more and 6.0 mass % or less, the mass ratio of the conductive carbon mass to the composite material mass may be between 3.0 mass % and 7.5 mass %.

Second Embodiment

In a second embodiment, an example of an electrode using the composite material 100 is shown. In the second embodiment, the description of the same configuration portion as that of the embodiment described previously may be omitted.

<Electrode>

Figure 3:
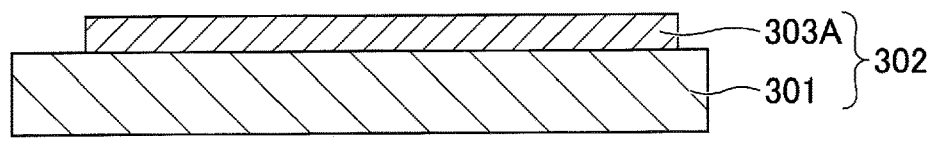
FIG. 3 is a cross-sectional view illustrating an example of an electrode according to the present embodiment.

FIG. 3 is a cross-sectional schematic diagram illustrating an example of an electrode according to the present embodiment.

Referring to FIG. 3, an electrode 302 is structured to have an electrode base 301 and an electrode composite material layer 303A formed on electrode base 301. The shape of the electrode 302 is not particularly limited and may be appropriately selected depending on the purpose. For example, the electrode 302 may be formed into a flat plate shape.

The electrode 302 according to the present embodiment has at least a composite material 100 and can be manufactured by applying a slurry-like application solution for electrode composite material layer 303 containing an active material, a conductive aid, a binder, a thickener, a conductive agent, a dispersion medium and the like, on the electrode base 301, and drying the electrode composite material layer.

<Active Material>

The active substances are not particularly limited as long as the material can absorb or release a predetermined ion.

For example, as the positive electrode active material in a lithium ion secondary battery, an alkali metal containing a transition metal compound capable of reversibly absorbing and releasing alkali metal ions can be used.

An example of the alkali metal containing the transition metal compound is a lithium containing a transition metal compound. The positive electrode active material may be used alone or two or more kinds of the positive electrode active material may be used in combination.

The lithium-containing transition metal compound includes, for example, one or more elements selected from the group consisting of cobalt, manganese, nickel, chromium, iron, and vanadium, and a complex oxide containing lithium. Examples include lithium-containing transition metal oxides such as lithium cobaltate, lithium nickelate, lithium manganate, olivine lithium salts such as $LiFePO_4$, titanium disulfide, chalcogen compounds such as molybdenum disulfide, manganese dioxide, and the like.

The lithium-containing transition metal oxide is a metal oxide containing lithium and a transition metal, or a metal oxide in which a portion of the transition metal in the metal oxide is replaced by a heterogeneous element. Examples of heterologous elements include Na, Mg, Sc, Y, Mn, Fe, Co, Ni, Cu, Cr, Pb, B, and the like. Among these, Mn, Al, Co, Ni, and Mg are preferred. The heterologous elements may be used in combination with two or more types, or may be used alone.

For example, as the negative electrode active material in a lithium ion secondary battery, a carbon material containing graphite having a graphite-type crystal structure capable of reversibly absorbing and releasing alkali metal ions can be used. Examples of the carbon material include natural graphite, artificial graphite in a spherical or fibrous form, carbon with low graphitization (hard carbon), carbon with easy graphitization (soft carbon), and the like. Examples of the negative active material other than the above-described carbon material include lithium titanate. High-capacity materials such as silicon, tin, silicon alloys, tin alloys, silicon oxide, silicon nitride, tin oxide, and the like can also be used as a negative active material in terms of energy density of a lithium ion secondary battery.

For example, as a positive electrode active material in a lithium ion capacitor, a carbon material capable of absorbing and releasing anions can be used. Examples of carbon materials include graphite, pyrolysis products of organic matter under various pyrolysis conditions, activated carbon, and the like. Examples of graphite include coke, artificial graphite, natural graphite, readily graphitizable carbon, low graphitic carbon, and the like.

The cathode active material may be used as one of the above materials alone or in combination with two or more of the above materials. Also, other substances such as lithium metal oxide may be used. Examples of the lithium metal oxide include lithium cobaltate, lithium nickelate, lithium manganate, lithium iron phosphate of the olivine type, and lithium manganese-cobalt-nickel tertiary oxide.

For example, a carbon material may be used as the negative active material in a lithium ion capacitor.

Carbon materials include, for example, graphite, pyrolysis products of organic matter under various pyrolysis conditions, lithium metal oxides, and the like.

Examples of the graphite include coke, artificial graphite, natural graphite, readily graphitizable carbon, low graphitization carbon, and the like.

However, the negative electrode active material is not particularly restricted if the cation can be absorbed and released in a non-aqueous system. Therefore, the negative electrode active material can be selected according to the purpose.

Examples of the materials used for the negative electrode active material include a carbon material capable of storing and releasing lithium ions as cations, a metal oxide, a metal or metal alloy capable of being alloyed with lithium, a complex alloy compound of a metal capable of being alloyed with lithium, an alloy containing lithium and lithium, a lithium metal nitride and the like.

Examples of metal oxides include antimony tin oxide, silicon monoxide, and the like.

Examples of metals or metal alloys that can be alloyed with lithium include lithium, aluminum, tin, silicon, zinc, and the like.

Complex alloy compounds of lithium and an alloy containing a metal capable of being alloyed with lithium and lithium include, for example, lithium titanate.

Examples of metallic lithium nitride include cobalt tritium nitride.

The materials used for these negative active substances may be used alone or in combination with two or more. Among these, artificial graphite, natural graphite, and lithium titanate are preferred.

<Binders and Thickeners>

For example, any of a fluorine-based binder, an acrylate-based latex and a carboxymethylcellulose (CMC) is preferably used as a binder and a thickener.

Examples of the fluorine-based binder include polyvinylidene fluoride (PVDF), polytetrafluoroethylene (PTFE) and the like.

Other examples of materials for the binder and the thickener include ethylene-propylene-butadiene rubber (EPBR), styrene-butadiene rubber (SBR), isoprene rubber, acrylate-based latex, carboxymethylcellulose (CMC), methyl cellulose, hydroxymethylcellulose, ethyl cellulose, polyacrylic acid, polyvinyl alcohol, alginic acid, starch oxide, starch phosphate, casein, and the like. These materials may be used alone or in combination with two or more of the materials.

In addition, the binder and the thickener are not particularly limited as long as the material is stable to the solvent, the electrolyte, and the applied potential used in manufacturing the electrode. The binder and the thickener are appropriately selected according to the purpose.

<Conductive Agent>

As the conductive agent, for example, natural graphite, graphites of artificial graphite, carbon black such as acetylene black, ketchen black, channel black, furnace black, lamp black, thermal black, and the like, conductive fibers such as carbon fiber, conductive fibers such as metal fibers, metal powders such as carbon fluoride and aluminum, conductive whiskers such as zinc oxide and potassium titanate, conductive metal oxides such as titanium oxide, phenylene derivatives, a conductive metal such as graphene derivatives and the like can be used.

<Dispersion Medium>

As the dispersion medium, there is no particular limitation, and the dispersion medium can be appropriately selected depending on the purpose. Examples include aqueous solvents, organic solvents, and the like. Examples of aqueous solvents include water, alcohols, and the like. Examples of organic solvents include N-methyl-2-pyrrolidone (NMP), toluene, and the like.

<Electrode Substrate>

As the electrode base 301, a flat and electrically conductive substrate can be used without any particular limitation. For example, aluminum foil, copper foil, stainless steel foil, titanium foil, or etched foil having fine holes etched thereon, a perforated electrode substrate used for lithium ion capacitors, or the like can be used as a storage device.

<<Method of Manufacturing Electrode>>

A method of manufacturing the electrode 302 includes forming the electrode composite material layer 303A on at least the electrode base 301.

The method of applying the application liquid 303 for forming the electrode composite material layer including the composite material 100 according to the present embodiment is not particularly limited, and the method may be appropriately selected. For example, a known printing method may be used. Among these, a liquid discharge method is preferable because the degree of freedom in design is high and because the thin film can be formed with a small amount of application liquid.

Examples of liquid ejection methods include an ink jet method, a spray drying method, a jet dispenser method, and the like.

Figure 4:
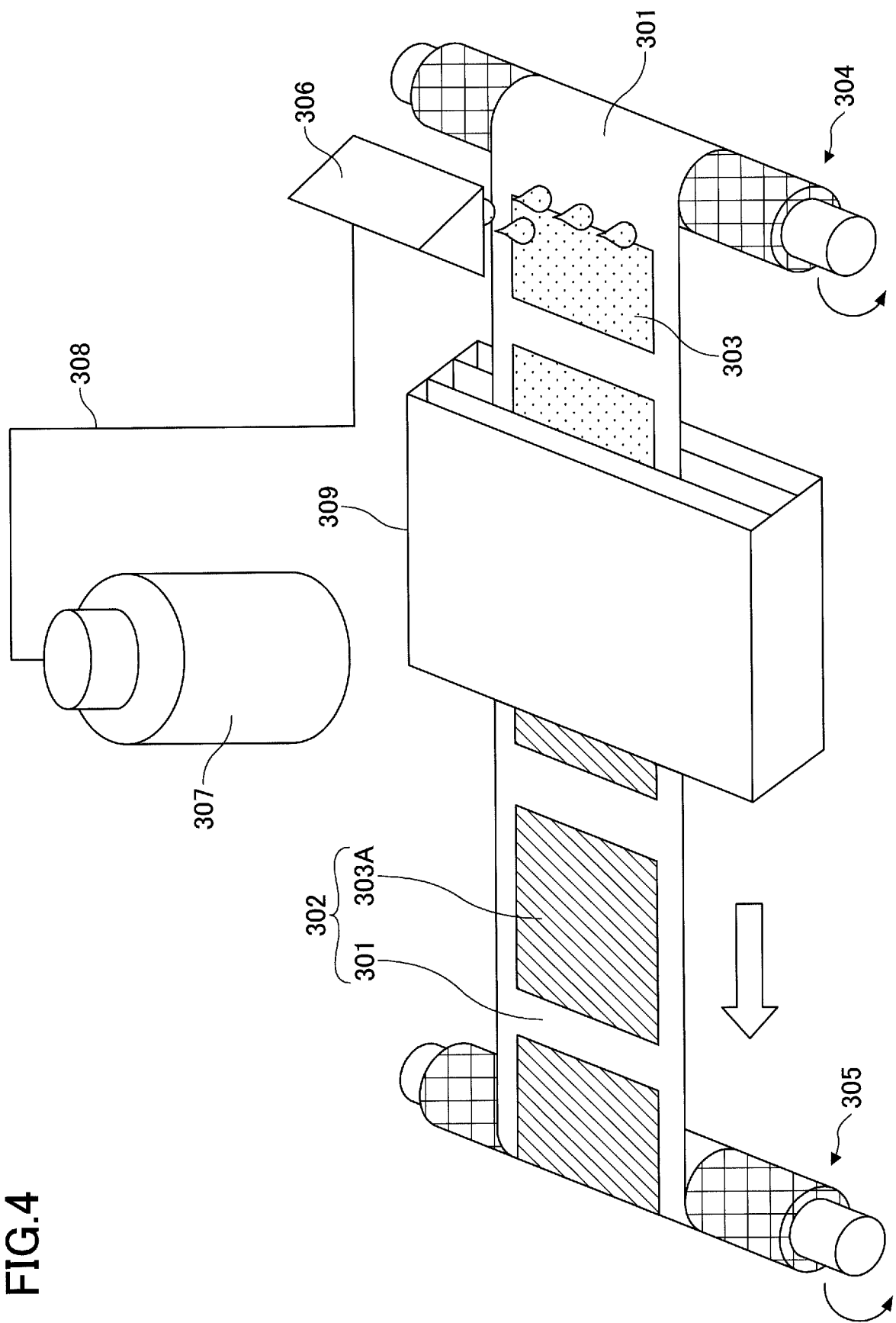
FIG. 4 is a schematic view showing an example of a method of manufacturing an electrode according to the present embodiment.

FIG. 4 shows an example of a method for manufacturing an electrode 302 that includes a composite material 100 according to the present embodiment.

The electrode 302 is manufactured by applying an electrode composite material layer forming an application liquid 303 containing a composite material 100 according to the present embodiment while conveying an electrode base 301.

Specifically, the electrode base 301 is wound around a cylindrical core, and the electrode base 301 is set to a feed roller 304 and a take-up roller 305 so that a face on which an arbitrary electrode composite material layer 303A is to be formed is located on the upper side. Here, the feed roller 304 and the take-up roller 305 rotate counterclockwise, and the electrode base 301 is conveyed from a right direction to a left direction.

Next, a liquid discharge mechanism 306 discharges a drop of the application liquid 303 for forming the electrode composite material layer onto the electrode base 301 to be conveyed. Here, the liquid discharge mechanism 306 is disposed above the electrode base 301 between the feed roller 304 and the take-up roller 305, and the application liquid 303 for forming the electrode composite material layer is supplied from a tank 307 to the liquid discharge mechanism 306 via a tube 308. The droplets of the application liquid 303 for forming the electrode composite material layer are discharged to cover at least a part of the electrode base 301.

The liquid discharge mechanism 306 may be disposed in a direction substantially parallel to or substantially perpendicular to the conveying direction of the electrode base 301.

Next, the electrode base 301 covered with the application liquid 303 for forming the electrode composite material layer is conveyed to the drying mechanism 309 by the feed roller 304 and the take-up roller 305 and dried. As a result, the coating solution 303 for forming the electrode composite material layer on the electrode base 301 dries to form the electrode composite material layer 303A, and the electrode 302 having the electrode composite material layer 303A is formed on the electrode base 301.

The drying mechanism 309 is not particularly limited as long as the drying mechanism 309 does not directly contact the application liquid 303 for forming the electrode composite material layer, and the drying mechanism 309 can be appropriately selected. Examples include a resistive heating heater, an infrared heater, a fan heater, and the like.

The drying mechanism 309 may be located above or below the electrode base 301.

The drying mechanism 309 may be disposed in a direction substantially parallel to the conveying direction of the electrode base 301.

As described above, because the electrode in accordance with the present embodiment has the composite material 100 having excellent electrical conductivity, high output performance can be obtained when the electrode is used in a power storage device.

Third Embodiment

In a third embodiment, an example of an electrode device using the composite material 100 is illustrated. In the third embodiment, the description of the same configuration portion as that of the embodiment described above may be omitted.

<Electrode Device>

Figure 5:
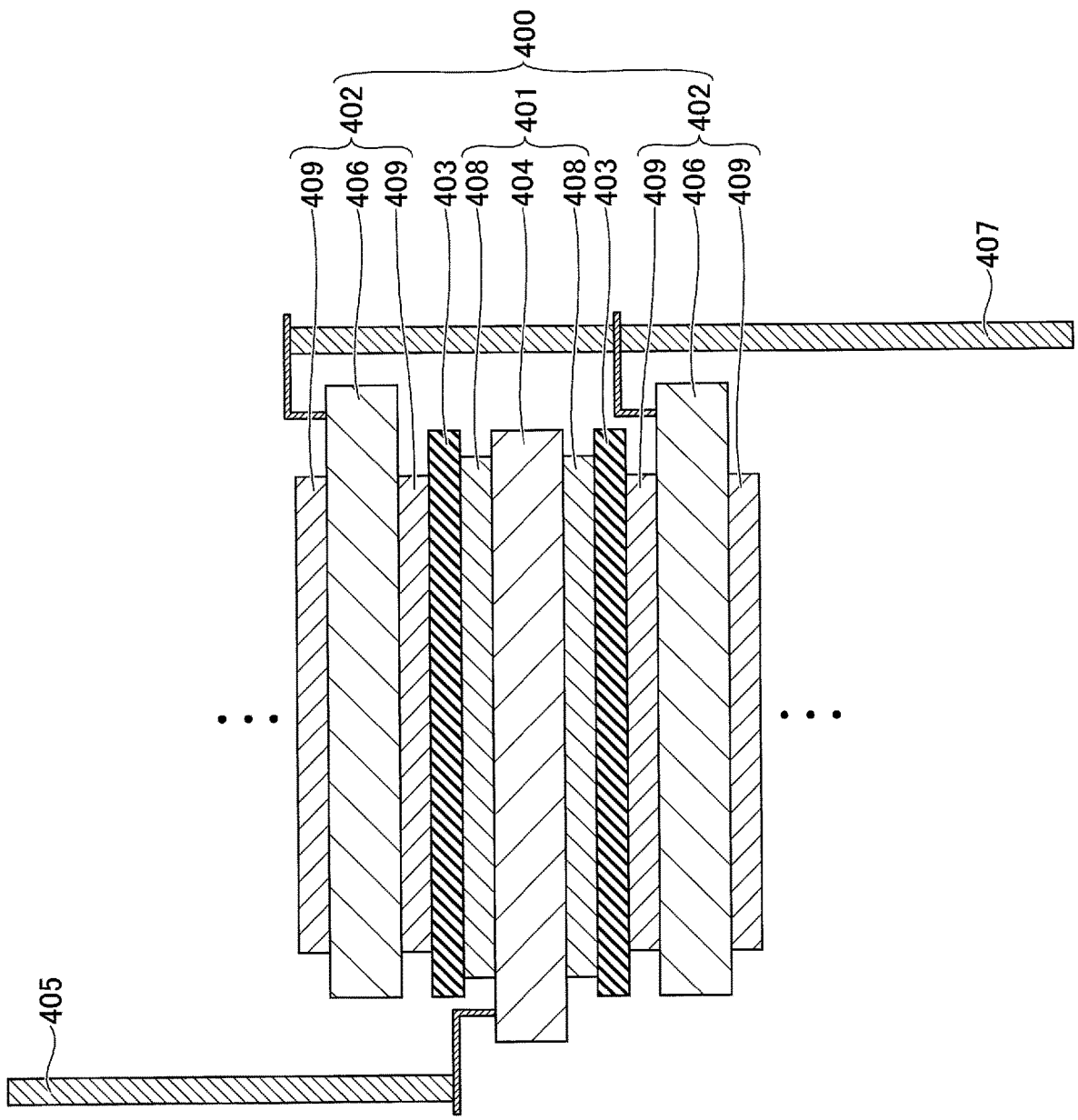
FIG. 5 is a cross-sectional view illustrating an example of an electrode device according to the present embodiment.

FIG. 5 is a cross-sectional schematic diagram illustrating an example of an electrode device according to the present embodiment.

Referring to FIG. 5, an electrode device 400 includes a structure in which a positive electrode 401 and negative electrodes 402 are layered on each other via separators 403 while being insulated from each other. In the electrode device 400, the positive electrodes 402 are layered on both sides of the negative electrode 401.

The separators 403 are provided between the negative electrode 401 and the positive electrodes 402 to prevent a short circuit between the negative electrode 401 and the positive electrodes 402.

The separators 403 are ionically permeable and not electron conductive. The separators 403 are not particularly limited, and the separators 403 can be appropriately selected depending on the purpose. Examples of the separators 403 include paper such as kraft paper, vinylon mixed paper, synthetic pulp mixed paper, cellophane, polyolefin non-woven fabric such as a polyethylene graft film, polypropylene meltflow non-woven fabric, polyamide non-woven fabric, glass fiber non-woven fabric, polyethylene microporous membrane, polypropylene microporous membrane, and the like.

The separators 403 preferably have a porosity of 50% or more from the viewpoint of retaining the non-aqueous electrolytic solution.

The average thickness of the separators 403 is preferably 3 to 50 μm. When the average thickness of the separators 403 is 3 μm or more, the short circuit between the negative electrode and the positive electrode is easily prevented, and when the average thickness is 50 μm or less, the electrical resistance between the negative electrode and the positive electrode is difficult to increase.

The shape of the separators 403 is not particularly limited as long as the separators 403 can be applied to a non-aqueous power storage device, and can be appropriately selected. For example, a sheet shape or the like may be applied.

The size of the separators 403 is not particularly limited and may be selected as appropriate as long as the separators 403 can be applied to a non-aqueous power storage device.

The separator 403 may have a single layer structure or a multiple layered structure.

A negative electrode lead wire 405 is connected to a negative electrode substrate 404. A positive electrode lead wire 407 is connected to the positive electrode base 406.

The negative electrode 401 has a negative electrode composite material layer 408 formed on both sides of the negative electrode base 404. The positive electrode 402 has positive electrode composite material layers 409 formed on both sides of the positive electrode base 406.

In the electrode device 400 in accordance with the present embodiment, the negative electrode composite material layer 408 and/or the positive electrode composite material layer 409 includes at least the composite material 100. However, from the point of oxidation-reduction potential, the positive electrode composite material layer 409 preferably include at least the composite material 100.

In the electrode device 400, the number of layers of the negative electrode 401 and the positive electrode 402 can optionally be determined. That is, FIG. 5 illustrates a total of three layers of one negative electrode 401 and two positive electrodes 402, but is not limited thereto, and many more negative electrodes 401 and positive electrodes 402 can be layered. On this occasion, the number of the negative electrode 401 and the number of the positive electrode 402 may be the same as each other.

As described above, because the electrode device according to the present embodiment has a composite material 100 having excellent electrical conductivity, high output performance can be obtained when the electrode device is used in a power storage device.

Fourth Embodiment

The fourth embodiment illustrates an example of a power storage device using a composite material 100. In the fourth embodiment, the description of the same configuration portion as that of the embodiment described above may be omitted.

<<<Power Storage Device>>>

The power storage device of the present embodiment may have at least a composite material 100, and may be a non-aqueous power storage device or an entirely solid power storage device.

<Non-Aqueous Power Storage Device>

Figure 6:
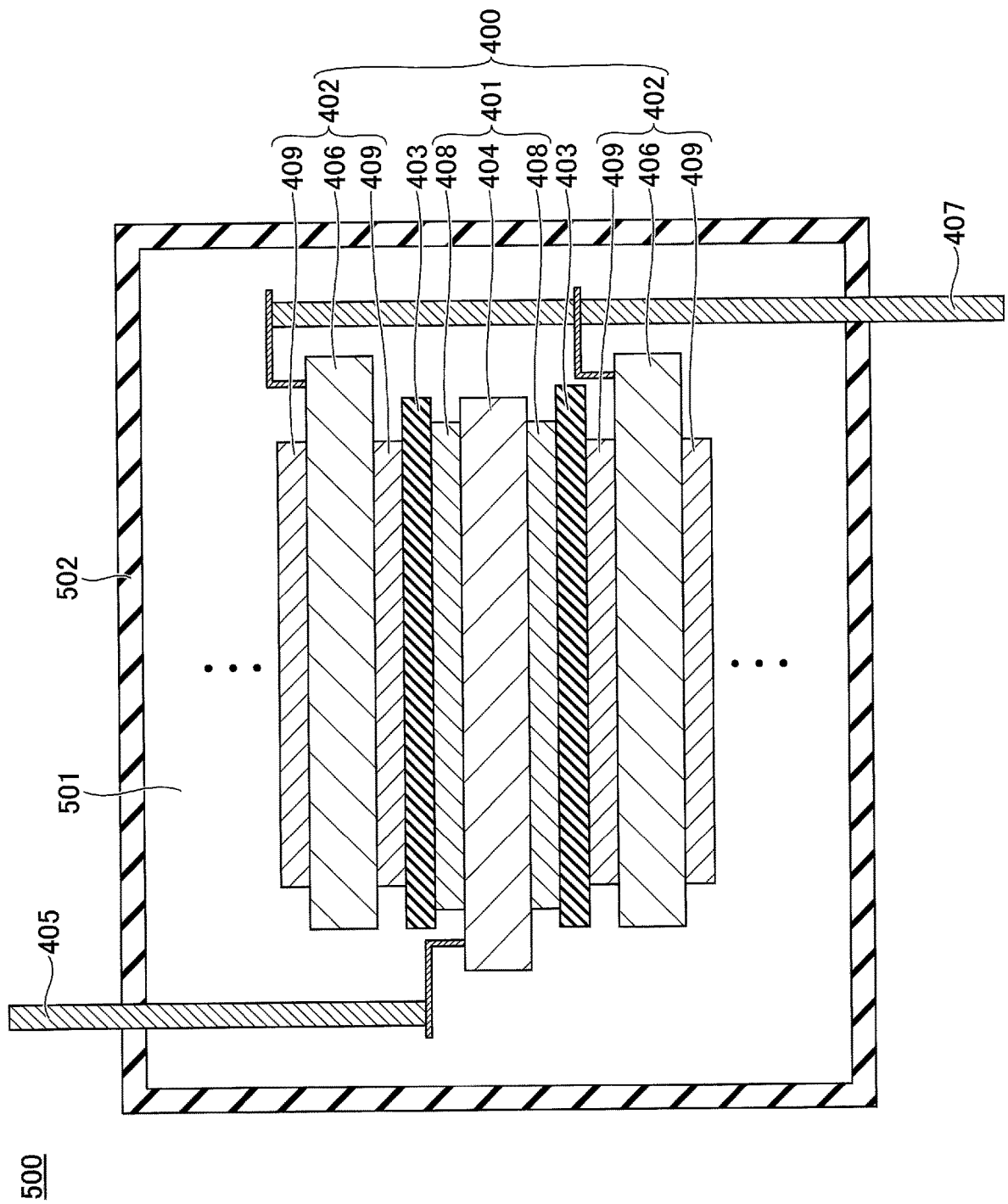
FIG. 6 is a cross-sectional view illustrating an example of a non-aqueous power storage device according to the present embodiment.

FIG. 6 is a cross-sectional schematic diagram illustrating an example of a non-aqueous power storage device according to the present embodiment.

Referring to FIG. 6, a non-aqueous power storage device 500 has a structure in which a non-aqueous electrolyte is injected into an electrode device 400 to form an electrolyte 501 and sealed with an outer sheath 502. In the non-aqueous power storage device 500, a negative electrode lead wire 405 and a positive electrode lead wire 407 are drawn out of the sheath 502. The non-aqueous power storage device 500 may have other components as necessary.

The non-aqueous power storage device 500 is not particularly limited and may be appropriately selected depending on the purpose. Examples include a non-aqueous secondary battery, a non-aqueous capacitor and the like.

The shape of the non-aqueous power storage device 500 is not particularly limited and may be selected from the known shapes according to the intended purpose. Examples include a laminate type, a cylinder type in which sheet electrodes and separators are spiraled, a cylinder type having an inside-out structure in which pellet electrodes and separators are combined, a coin type in which pellet electrodes and separators are stacked, and the like.

Hereinafter, the non-aqueous power storage device 500 will be described in detail. Here, the negative electrode and the positive electrode may be collectively referred to as an electrode; the electrode base for the negative electrode and the electrode base for the positive electrode may be collectively referred to as an electrode base; and the negative electrode composite material layer and the positive electrode composite material layer may be collectively referred to as an electrode composite material layer.

<Electrolyte>

The non-aqueous electrolyte solution constituting the electrolyte 501 is an electrolyte solution containing a non-aqueous solvent and an electrolyte salt.

The non-aqueous solvent is not particularly limited, and can be appropriately selected depending on the purpose, but the non-protic organic solvent is preferably selected.

As the aprotic organic solvent, a carbonate-based organic solvent such as a linear carbonate or a cyclic carbonate, may be used.

Examples of the chain carbonate include dimethyl carbonate (DMC), diethyl carbonate (DEC), ethyl methyl carbonate (EMC), methyl propionate (MP), and the like.

Examples of the cyclic carbonate include propylene carbonate (PC), ethylene carbonate (EC), butylene carbonate (BC), vinylene carbonate (VC), and the like. Of these, ethylene carbonate (EC) and dimethyl carbonate (DMC) are preferably used in combination. On this occasion, there is no particular restriction on the mixing ratio of ethylene carbonate (EC) and dimethyl carbonate (DMC), and the mixing ratio may be selected according to the purpose.

In the present embodiment, a non-aqueous solvent other than the carbonate-based organic solvent may be used, as necessary.

As the non-aqueous solvent other than the carbonate-based organic solvent, a cyclic ester, an ester-based organic solvent such as a chain ester, a cyclic ether, an ether-based organic solvent such as a chain ether, and the like may be used.

Examples of cyclic esters include γ-butyrolactone (γBL), 2-methyl-γ-butyrolactone, acetyl-γ-butyrolactone, γ-valerolactone, and the like.

Examples of the chain ester include alkyl ester propionate, dialkyl ester malonate, alkyl ester acetate (methyl (MA) acetate, ethyl acetate, and the like), alkyl ester formate (methyl (MF) formate, ethyl formate, and the like), and the like.

Examples of the cyclic ethers include tetrahydrofuran, alkyltetrahydrofuran, alkoxytetrahydrofuran, dialkoxytetrahydrofuran, 1,3-dioxolane, alkyl-1,3-dioxolane, 1,4-dioxolane, and the like.

Examples of the chain ethers include 1,2-dimethociquiethane (DME), diethyl ether, ethylene glycol dialkyl ether, diethylene glycol dialkyl ether, triethylene glycol dialkyl ether, tetraethylene glycol dialkyl ether, and the like.

As the electrolyte salt, lithium salt is preferred, although there is no particular limitation as long as the electrolyte salt has a high ionic conductivity and can be dissolved in a non-aqueous solvent.

The lithium salt is not particularly limited and may be selected according to the purpose. Examples include lithium hexafluorophosphate ($LiPF_6$), lithium perchlorate ($LiClO_4$), lithium chloride (LiCl), lithium borofluoride ($LiBF_4$), lithium hexafluoride ($LiAsF_6$), lithium trifluorometasulfonate ($LiCF_3SO_3$), lithium bis-trifluoromethylsulfonyl imide ($LiN(C_2F_5SO_2)_2$), lithium bisphoroethyl sulfonyl imide ($LiN(CF_2F_5SO_2)_2$), and the like. Of these, $LiPF_6$ is particularly preferred from the viewpoint of the absorption quantity of anions stored in the electrode.

The electrolyte salt may be used alone or two or more kinds may be used in combination. The amount of electrolyte salt in the non-aqueous electrolyte solution is not particularly limited and may be appropriately selected depending on the purpose.

<Entirely Solid Power Storage Device>

Figure 7:
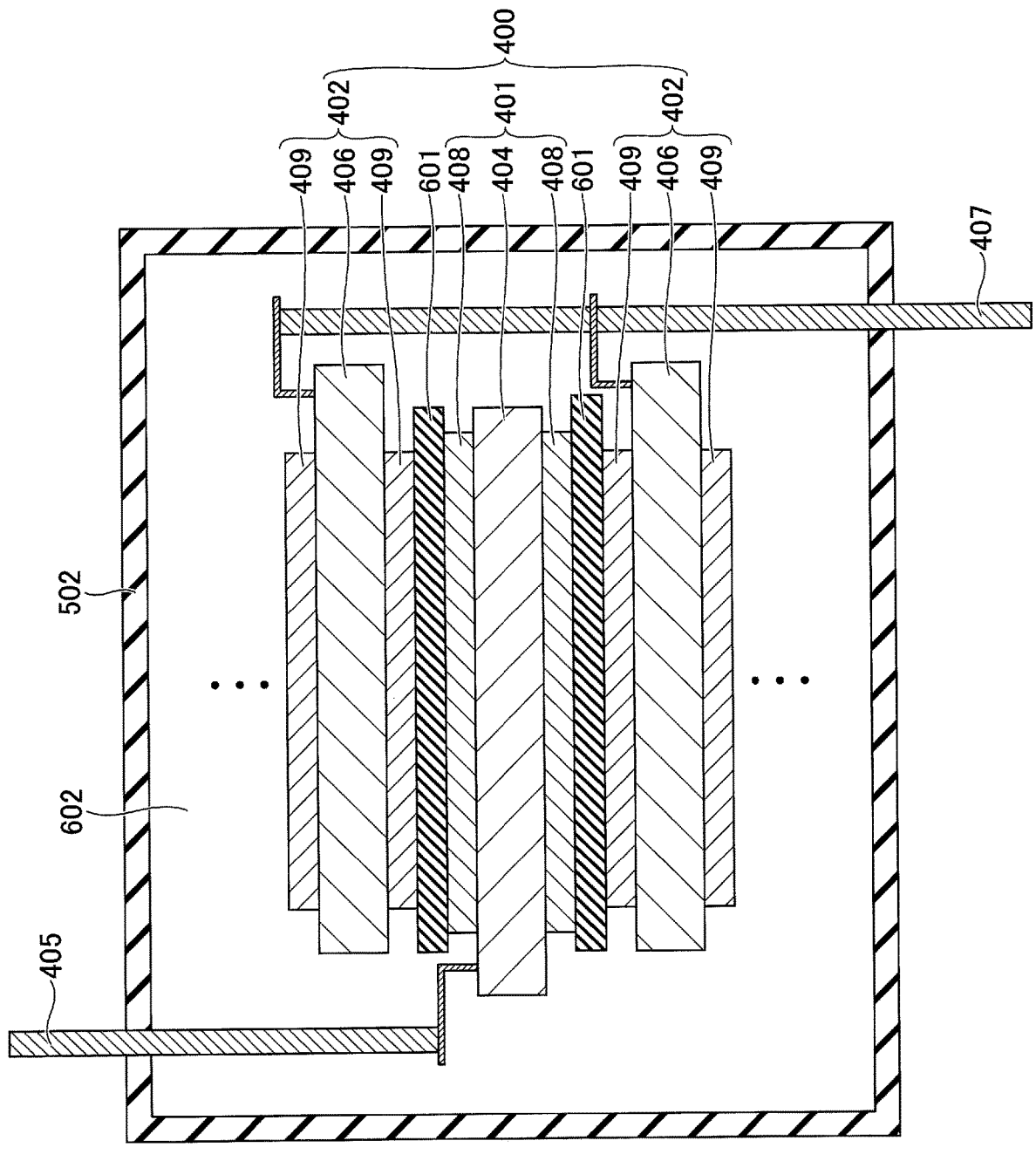
FIG. 7 is a cross-sectional schematic view illustrating an example of a total solid-state power storage device according to the present embodiment.

FIG. 7 is a cross-sectional schematic diagram illustrating an example of an entirely solid power storage device according to the present embodiment.

Referring to FIG. 7, the entirely solid power storage device 600 has a structure in which the positive electrode 402 and the negative electrode 401 are disposed through a solid electrolyte 601 and sealed by an outer sheath 502. In the entirely solid power storage device 600, the negative lead wire 405 and positive lead wire 407 are drawn out of the sheath 502 to the outside. The entirely solid power storage device 600 may have other components as necessary.

Examples of solid electrolyte particles that can be used as the solid electrolyte 601 include sulfide-based amorphous solid electrolyte particles, oxide-based amorphous solid electrolyte particles, crystalline oxide and the like.

<<<Intended Use of Storage Device>>>

The intended use of the non-aqueous power storage device 500 and the entirely solid power storage device 600 according to the present embodiment are not particularly limited and can be used for various applications. For example, the applications include a mobile body such as an automobile, a laptop computer, a pen input PC, a mobile PC, an electronic book player, a cellular phone, a portable fax, a portable copy, a portable printer, a headphone stereo, a video movie, an LCD TV, a handy cleaner, a portable CD, a mini disc, a transceiver, an electronic pocketbook, an electronic calculator, a memory card, a portable tape recorder, a radio, a backup power supply, a motor, alighting apparatus, a toy, a game apparatus, a watch, a strobe, a camera, and the like.

As described above, because the storage device in accordance with the present embodiment has a composite material 100 having excellent electrical conductivity, that high output performance can be obtained.

EXAMPLE

Hereinafter, examples of the present disclosure will be described, but the present disclosure is not limited to these examples.

To verify the state of the composite material 100 used as the electrode material in each of Examples and Comparative Examples, the following evaluation was performed.

Example 1

<Manufacture of Composite Material 100>

—Stirring Process—

The 3.7 L of distilled water was added to a 5 L beaker, and 261 g of lithium carbonate (FUJIFILM Wako Pure Chemical Industries, Ltd.) and 816 g of phosphoric acid (FUJIFILM Wako Pure Chemical Industries, Ltd.) were charged to obtain an aqueous solution of lithium phosphate by stirring the distilled water at room temperature (25° C.). Herein, 432 g of vanadium pentoxide (Taiyo Kogyo Co., Ltd.) and 246 g of sucrose (FUJIFILM Wako Pure Chemical Co., Ltd.) were added and stirred at 80° C., and a precipitation reaction was performed to obtain a reaction liquid containing a solid.

—Milling Process—

After the reaction liquid was cooled, a zirconia ball having a diameter of 0.5 mm was charged into a wet milling machine (LMZ015, manufactured by Ashizawa Finetech Ltd.), and a milling process was performed by a bead mill until the median diameter of the milled object in the reaction liquid reached 0.7 μm or less, thereby obtaining a dispersion slurry containing a primary material 101.

—Drying Process—

A dispersed slurry was supplied to a spray drying device having a temperature set to 150° C. at a hot air inlet, and a secondary material 102 was obtained.

—Baking Process—

The obtained secondary material was placed in an alumina pot, heated from 25° C. to 300° C. at a temperature increasing rate of 100° C.·h$^{-1}$ under a nitrogen gas (inert gas) atmosphere, and pre-baked at 300° C. for two hours. The temperature was then increased from 300° C. to 900° C. under the same conditions at a temperature increasing rate of 600° C.·h$^{-1}$, and baked at 900° C. for two hours, thereby obtaining a composite material 100.

The obtained composite material 100 had a carbon content of 4.7 mass %, a true density of 3.07 g·cm$^{-3}$, and a crystallite size of 49 nm.

<Liquid Property Evaluation>

—Preparation of Application Liquid for Liquid Property Evaluation—

An application liquid for liquid property evaluation was obtained by adding 84 parts by mass of NCA (manufactured by JFE Mineral Company Ltd.) as a positive electrode active material, 10 parts by mass of a composite material 100 as an additive for power storage device, 1 part by mass of ketchen black as a conductive aid, and 2 parts by mass of carbon fiber (manufactured by Showa Denko K.K.), 3 parts by mass of polyvinylidene fluoride (PVDF) as a binder, and 100 parts by mass of N-methyl-2-pyrrolidone (NMP) as a dispersion medium.

—Liquid Property Assessment—

A rotor of No. 4 was attached to a B-type viscometer (HBPV-II+Pro, manufactured by Brookfield Engineering Laboratories, Inc.), and viscosity of an application liquid 303 for forming an electrode composite material layer containing the composite material 100 at 6 rpm and viscosity at 60 rpm were measured at 25° C. The thixotropy index (TI) was calculated using an equation (1) below.

[Formula 1]

$$TI = (VISCOSITY\ AT\ 6\ rpm)/(VISCOSITY\ AT\ 60\ rpm) \quad (1)$$

Next, the liquid property of the application liquid for forming the electrode composite material layer was evaluated based on the following evaluation criteria. The results are shown in Table 1.

[Evaluation Criteria for Liquid Property]

OK: TI is in a range of 1.5 to 6.0.

NG: TI is less than 1.5 or greater than 6.0.

<High Output Evaluation>

Figure 8B:
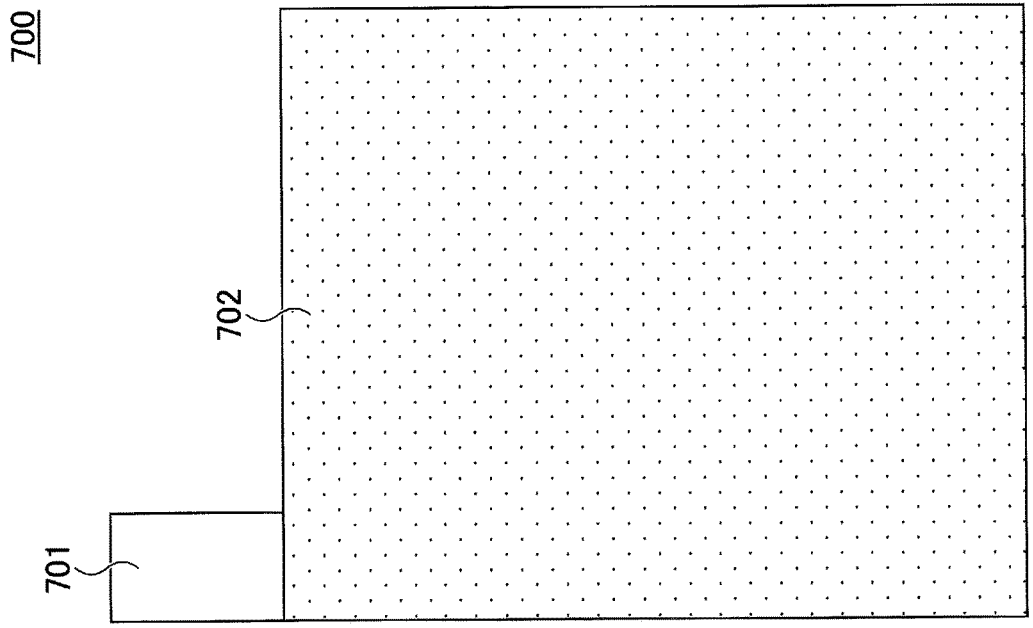
FIGS. 8A and 8B are schematic views of a positive electrode and a counter electrode of an evaluation storage device of a composite material according to the present working example.
Figure 8A:
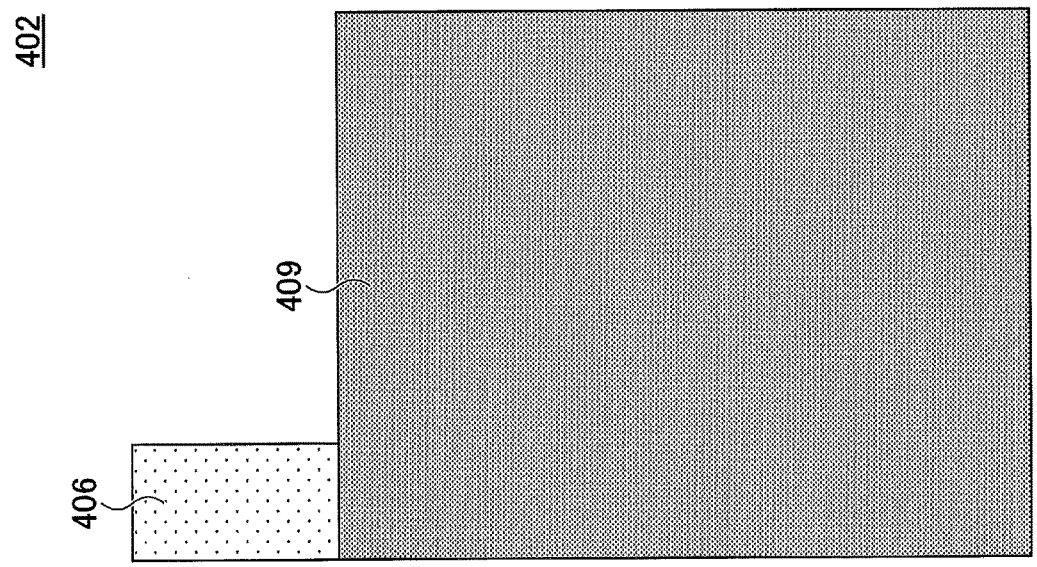
Figure 9:
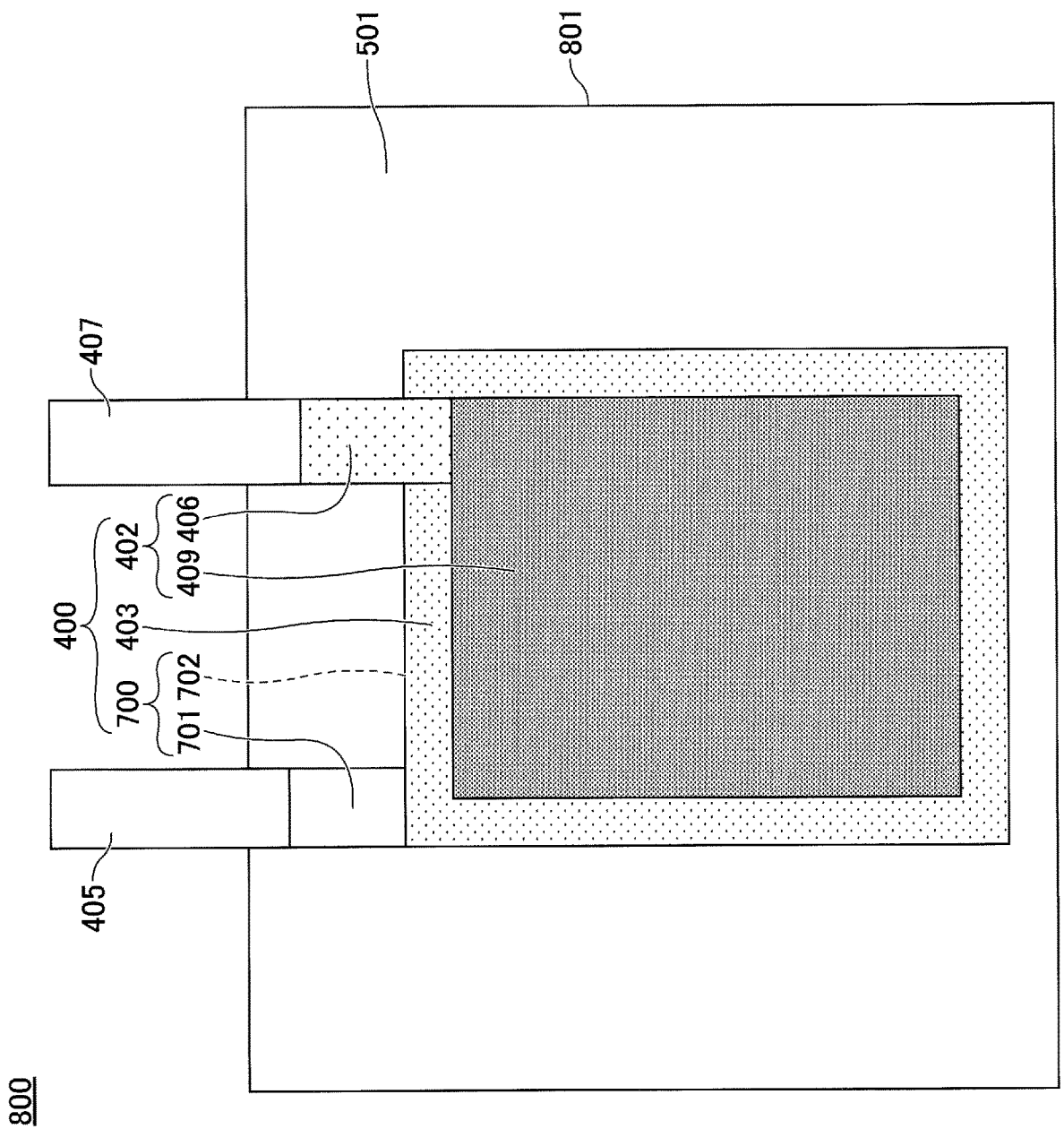
FIG. 9 is a schematic view of an evaluation storage device of a composite material according to the present working example.

FIGS. 8A and 8B are schematic diagrams of the positive and opposite electrodes of the power storage device for evaluating the composite material 100 in of the working examples. FIG. 9 is a schematic diagram of a power storage device for evaluating a composite material 100 of the working examples.

—Positive Electrode 402—

An application liquid 303 for forming the electrode composite material layer was obtained by adding 88 parts by mass of the composite material 100 as the positive electrode active material, 1 part by mass of ketchen black as the conductive aid, 2 parts by mass of carbon fiber (manufactured by Showa Denko Co., Ltd.), 9 parts by mass of polyvinylidene fluoride (PVDF) as the binder, and 100 parts by mass of N-methyl-2-pyrrolidone (NMP) as the dispersion medium.

Next, the obtained application liquid 303 for forming the electrode composite material layer was applied to a 15-μm aluminum foil serving as the electrode base 406 for the positive electrode using a comma coater, and then dried, thereby forming the positive electrode composite material layer 409. On this occasion, the application liquid 303 for forming the electrode composite material layer was applied so that the area density of the positive electrode layer 409 in the region (one side) where the positive electrode material was formed was 5.0 mg·cm$^{-3}$. Then, the positive electrode 402 was cut out to a predetermined size (see FIG. 8A).

—Counter Electrode 700—

The counter electrode 700 was fabricated by attaching a lithium metal foil (manufactured by Honjo Metal Co. Ltd.) 702 to one side of a copper foil as the counter electrode base 701 (see FIG. 8B).

—Separator 403—

As the separator 403, a polypropylene film (manufactured by Sekisui Chemical Co., Ltd.) was prepared.

—Electrolyte 501—

As the electrolyte 501, a mixture of ethylene carbonate (EC) containing 1.5 M of LiPF$_6$ electrolyte:dimethyl carbonate (DMC):ethylmethyl carbonate (FMC)=1:1:1 (volume ratio) (manufactured by Kiida Chemical Co., Ltd.) was used.

—Manufacture of Power Storage Device 800 for Evaluation—

The electrode device 400 was fabricated by stacking the above-described positive electrode 402 and the counter electrode 700 via a separator 403. The electrode device 400 was caused to contain the electrolyte 501 and was enclosed in an aluminum laminate film 801. Then, a positive electrode leasing wire 407 made of nickel and a negative electrode leading wire 405 made of aluminum were welded to the positive electrode base 406 and the counter electrode base 701, respectively, and a power storage device 800 for evaluation was produced (FIG. 9).

—Charge and Discharge Test—

The following charge/discharge test was performed by holding the obtained power storage device 800 for evaluation of Working Example 1 in a constant temperature bath at 25° C., and using a charge/discharge measuring device (TOSCAT3001, manufactured by Toyo System Co. Ltd.).

First, the power storage device 800 for evaluation was charged to 4.2 V as the end-of-charge voltage at a constant current with a value equivalent to a charge/discharge rate of 0.2 C.

Thereafter, a constant current discharge was performed up to 2.5 V as the end-of-discharge voltage at a current value equivalent to a charge/discharge rate of 0.2 to 10 C.

The current value equivalent to the charge/discharge rate of 0.2 C means a current value in which when a power storage device having a nominal capacity is discharged at a constant current, the discharge is completed in 5 hours. The current value converted to the charge/discharge rate of 1 C is the current value in which when a power storage device having a nominal capacity discharges a constant current, the discharge is completed in one hour.

To evaluate the output performance, the ratio of the discharging capacity of the 10 C discharge to the discharging capacity of the 0.2 C discharge was calculated using Formula (2) below. The fact that the capacity ratio is close to 100% means that the output performance is high because it indicates that it has good electrical conductivity that can accept even the high C rate.

[Formula 2]

$$\text{capacity ratio (\%)} = \frac{\text{DISCHARGED CAPACITY AT 10 } C \text{ DISCHARGE}}{\text{DISCHARGED CAPACITY AT 0.2 } C \text{ DISCHARGE}} \times 100 \quad (2)$$

Figure 10:
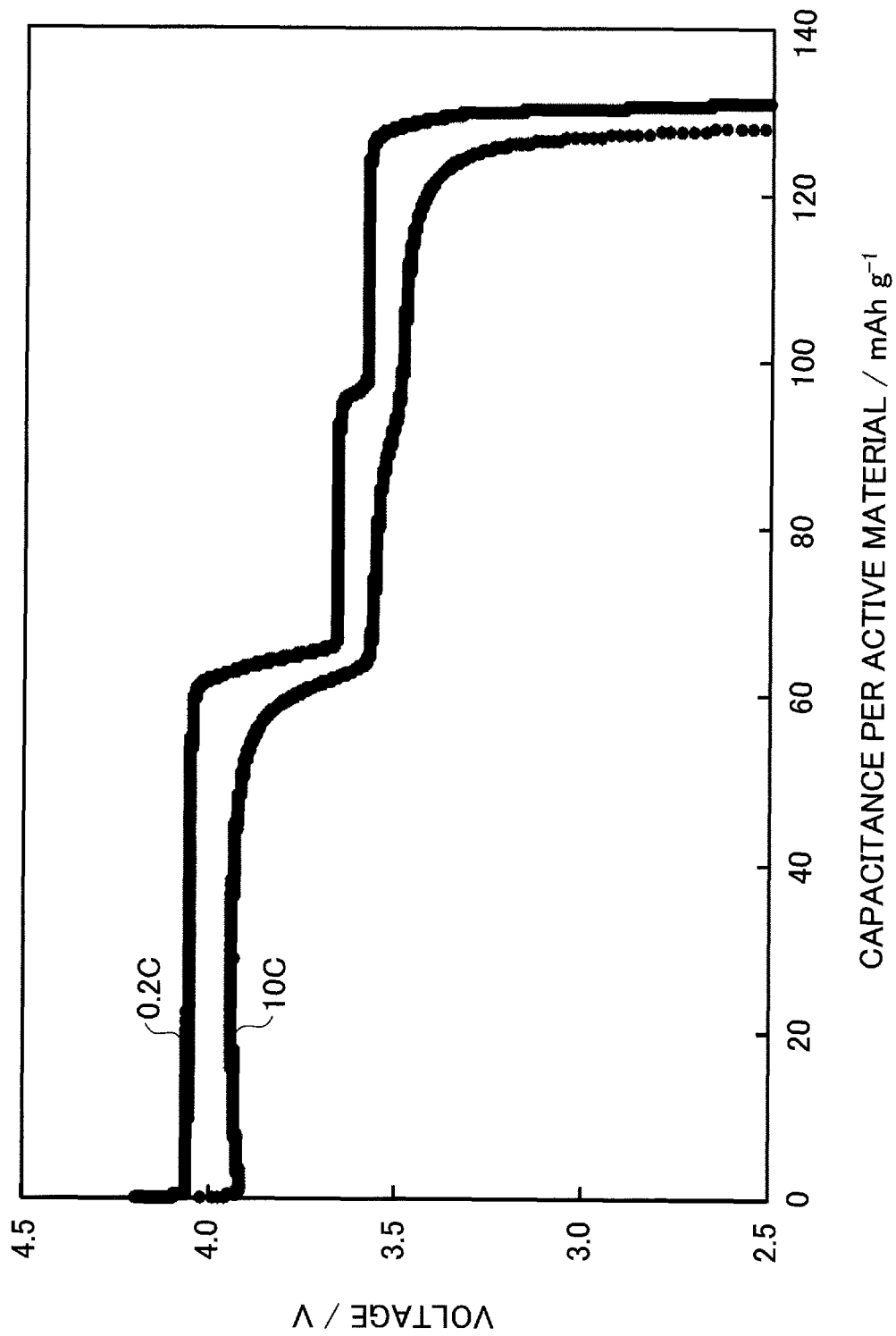
FIG. 10 is a diagram illustrating a discharge curve according to a working example 1.

Next, high output performance was evaluated based on the following evaluation criteria. The results are shown in Table 1, and the discharge curve is shown in FIG. 10.

[High Power Evaluation Criteria]
Good: The 85% or more of the discharge capacity at 10 C discharge compared to the discharge capacity at 0.2 C discharge.
Fair: The ratio of the discharge capacity at 10 C discharge to the discharge capacity at 0.2 C discharge is less than 85% and 83% or more.
Poor: The ratio of the discharge capacity at 10 C discharge to the discharge capacity at 0.2 C discharge is less than 83%.

Working Example 2

The composition of the composite material 100 was evaluated for liquid and output in the same manner as Working Example 1 except that the carbon content was changed to 2.5 mass %; the true density was changed to 3.02 g·cm$^{-3}$; and crystallite size was changed to 44 nm.

Working Example 3

The composition of the composite material 100 was evaluated for liquid properties and output performance in the same manner as Working Example 1 except that the carbon content was changed to 7.5 mass %; the true density was changed to 3.03 g·cm.sup.–3; and the crystallite size was changed to 49 nm.

Working Example 4

The composition of the composite material 100 was evaluated for liquid properties and output performance in the same manner as Working Example 1 except that the carbon content was changed to 4.6 mass %, the true density was changed to 2.90 g·cm$^{-3}$, and the crystallite size was changed to 45 nm.

Working Example 5

The composition of the composite material 100 was evaluated for liquid properties and output performance in the same manner as Working Example 1 except that the carbon content was changed to 4.7 mass %; the true density was changed to 2.88 g·cm$^{-3}$, and crystallite size was changed to 50 nm.

Working Example 6

The composition of the composite material 100 was evaluated for liquid properties and output performance in the same manner as Working Example 1 except that the carbon content was changed to 5.1 mass %; the true density was changed to 2.96 g·cm$^{-3}$; and the crystallite size was changed to 55 nm.

Working Example 7

The composition of the composite material 100 was evaluated for liquid properties and output performance in the same manner as Working Example 1 except that the carbon content was changed to 5.2 mass %; the true density was changed to 2.93 g·cm$^{-3}$; and the crystallite size was changed to 57 nm.

Comparative Example 1

The composition of the composite material 100 was evaluated for liquid properties and output performance in the same manner as Working Example 1 except that the carbon content was changed to 2.3 mass %; the true density was changed to 3.04 g·cm$^{-3}$, and crystallite size was changed to 46 nm.

Comparative Example 2

The composition of the composite material 100 was evaluated for liquid properties and output performance in the same manner as Working Example 1 except that the carbon content was changed to 7.7 mass %, the true density was changed to 3.02 g·cm$^{-3}$, and the crystallite size was changed to 52 nm.

TABLE 1

| | CARBON AMOUNT (wt %) | TRUE DENSITY (g · cm$^{-3}$) | CRYSTALLITE SIZE (nm) | DISCHARGED CAPACITY MAINTENANCE RATE (%) | OUTPUT PERFORMANCE | TI | LIQUID PROPERTY OF BATTERY PAINT |
|---|---|---|---|---|---|---|---|
| WORKING EXAMPLE 1 | 4.7 | 3.07 | 49 | 98 | GOOD | 4.5 | ○ |
| WORKING EXAMPLE 2 | 2.5 | 3.02 | 44 | 87 | GOOD | 3.8 | ○ |

TABLE 1-continued

| | CARBON AMOUNT (wt %) | TRUE DENSITY (g · cm⁻³) | CRYSTALLITE SIZE (nm) | DISCHARGED CAPACITY MAINTENANCE RATE (%) | OUTPUT PERFORMANCE | TI | LIQUID PROPERTY OF BATTERY PAINT |
|---|---|---|---|---|---|---|---|
| COMPARATIVE EXAMPLE 1 | 2.3 | 3.04 | 46 | 82 | POOR | 3.7 | ○ |
| WORKING EXAMPLE 3 | 7.5 | 3.03 | 49 | 97 | GOOD | 5.9 | ○ |
| COMPARATIVE EXAMPLE 2 | 7.7 | 3.02 | 52 | 97 | GOOD | 6.1 | X |
| WORKING EXAMPLE 4 | 4.6 | 2.90 | 45 | 86 | GOOD | 4.6 | ○ |
| WORKING EXAMPLE 5 | 4.7 | 2.88 | 50 | 83 | FAIR | 4.6 | ○ |
| WORKING EXAMPLE 6 | 5.1 | 2.96 | 55 | 87 | GOOD | 5.0 | ○ |
| WORKING EXAMPLE 7 | 5.2 | 2.93 | 57 | 84 | FAIR | 5.1 | ○ |

The results in Table 1 showed the following matters with respect to the composite material 100 containing vanadium lithium phosphate 104 and the conductive carbon 103. That is, Working Examples 1 to 7 using the composite material 100 including the conductive carbon 103 in a range of 2.5 mass % to 7.5 mass % as an additive for a power storage device have high output performance and exhibit favorable liquid properties.

Comparing Working Example 2 with Comparative Example 1, the amount of conductive carbon 103 of 2.5 mass % or more was found to have high output performance. This is believed to be due to the formation of good conductive paths between the composite materials 100.

Comparing Working Example 3 with Comparative Example 2, when the amount of conductive carbon 103 is 7.5 mass % or less, Table 1 indicates that the composite material 100 has good liquid properties. This is thought to be due to the decrease in specific surface area of the composite material 100, which causes a decrease in influence on the liquid properties.

When Working Example 4 is compared to Working Example 5, Table 1 indicates that when the amount of conductive carbon is not less than 2.5 mass % and not more than 7.5 mass %, and when the true density of the composite material 100 is not less than 2.90 g·cm⁻³, the composite material 100 has higher output performance. This is believed to be due to the better lithium ion diffusion and electron transfer in the composite material 100.

When Working Example 6 is compared to Working Example 7, Table 1 indicates that when the amount of conductive carbon is not more than 2.5 mass % and not less than 7.5 mass % and when the crystallite size of composite material 100 is not greater than 55 nm, the composite material 100 has the higher output performance. This is thought to be because the diffusion path of lithium ions is short, and because the diffusion properties becomes higher.

In the meantime, the physical property value of the composite material according to the present embodiment is not disclosed or suggested in the above-described Patent Document 1, and the problem according to the present embodiment is not set.

As described above, the present embodiments can provide a composite material that has a preferable conductivity and a preferable printing property when being applied to an application liquid.

Fifth Embodiment

In a fifth embodiment, a method of manufacturing a composite material is described below.

In recent years, performance improvement and downsizing of power storage devices such as secondary batteries and power generation devices such as fuel cells are expected. Therefore, in order to implement high performance and downsizing, a high-performance electrode material is actively developed.

For example, Japanese Patent No. 5255138 provides a complex member of an active material and a conductive carbon that can be used as a positive electrode active material of a lithium ion secondary battery.

However, when the producing the complex member of the active material and the conductive carbon, the complex member is likely to have cavities.

When a composite material with many cavities is used as an electrode material in a power storage device, the cavities block the movement of electrons and ions, which increases internal resistance and thus decreases the output performance.

The present embodiment is intended to provide a method of manufacturing a composite material having high true density and high output performance.

Hereinafter, the present embodiment will be described with reference to the drawings. In each drawing, the same components are indicated by the same reference numerals and overlapping descriptions may be omitted. In the description, FIGS. 1 and 2 are referred to again.

The method of manufacturing a composite material according to the present embodiment includes an agitation process (S201) for adding an active raw material, and one of an electrically conductive carbon and an electrically conductive carbon precursor to a solvent, and heating and stirring the solvent, a milling process (S202) for obtaining a milled object that is a slurry-like fluid by applying a wet milling process on a solid object in a liquid, which is a product obtained in the stirring process, and a baking process (S204) for obtaining a composite material by baking the milled object obtained in the milling process is fired to obtain, wherein the baking step is a two-step baking.

The composite material obtained by the method of manufacturing the composite material according to the present embodiment contains an active material and a conductive carbon.

In the present embodiment, the active material is not particularly limited as long as the active material is a material that absorbs or releases a predetermined ion.

In the present embodiment, the composite material 100 in which the active material is lithium vanadium phosphate will be described. However, the active material may be, for example, lithium iron phosphate, cobalt tritium phosphate, manganese lithium phosphate, lithium titanate, silicone, and the like.

FIG. 1 illustrates an example of a composite material obtained by a method of manufacturing a composite material according to the present embodiment.

<Composite Material>

The composite material 100 obtained by the method of manufacturing the composite material according to the present embodiment is a composite material containing lithium vanadium phosphate and electrically conductive carbon.

When vanadium lithium phosphate is used as the electrode material, a coating of conductive carbon is required to compensate for the lack of conductivity of vanadium lithium phosphate.

The composite material 100 obtained by the manufacturing method according to the present embodiment is classified into a primary material 101, which is an aggregate of crystallites, and a secondary material 102, which is an aggregate of primary materials 101.

The shape of the primary material 101 and the secondary material 102 are not particularly limited and include, for example, agglomerates, bars, plates, disks, particles, and the like. In particular, the shape of the primary material 101 and the secondary material 102 are preferably in the form of particles in order to have excellent handleability, high density, and excellent processability of liquid discharge and the like.

By granulating the primary material 101 to form the secondary material 102, the handleability when making the electrodes can be improved.

On the surface of the primary material 101 that constitutes the secondary material 102, there is a coating layer made of the conductive carbon 103, and the coating layer made of the conductive carbon 103 maintains the conductivity of the secondary material 102.

However, if the coating layer of the conductive carbon 103 on the surface of the primary material 101 is too thick, the specific surface area of the secondary material 102 will increase. If the specific surface area of the secondary material 102 is increased, the thixotropy property is increased when a liquid such as an application liquid containing the composite material 100 is fabricated, which causes deterioration of the liquid property, a decrease in the density of the electrode layer due to the bulking of the particles, and a consequent decrease in the energy density of the power storage device.

The composite material 100 obtained by the method according to the present embodiment contains vanadium lithium phosphate 104 and an electrically conductive carbon 103.

Lithium vanadium phosphate 104 of the composite material 100 obtained by the manufacturing method according to the present embodiment is a compound represented by the chemical formula $Li_3V_2(PO_4)_3$ or the general formula $Li_xV_2-yM_y(PO_4)z$ (here, $0<x\leq3$, $0\leq y<2$, and $2\leq z<3$, and M is one or more of the compounds selected from the group consisting of Fe, Co, Mn, Cu, Zn, Sn, Sn, B, Ga, Cr, V, Ti, Mg, Ca, Sr, Zr, Nb, Y, Na, and W), among which $Li_3V_2(PO_4)_3$ is preferred because it is difficult to decompose the electrolytic solution when used in the power storage device.

The coating amount on the composite material 100 obtained by the manufacturing method according to the present embodiment is in the range of 2.5 mass % to 7.5 mass %, and more preferably in the range of 4.0 mass % to 6.5 mass % with respect to the entire composite material 100.

If the coating amount on the composite material 100 by the conductive carbon 103 is less than 2.5 mass %, the powder resistance of the composite material 100 increases and the output performance of the power storage device decreases. Further, if the coating amount on the composite material 100 by the conductive carbon 103 is greater than 7.5 mass %, the specific surface area of the composite material 100 is increased, and the liquid properties when the liquid such as the coating liquid containing the composite material deteriorate, and a coating failure occurs.

The coating amount of the conductive carbon 103 of the composite material 100 can be measured, for example, by a solid sample combustion device (SSM-5000A, Shimadzu Corporation) and a total organic carbon meter (TOC-VCSH, Shimadzu Corporation).

The true density of the composite material 100 obtained by the manufacturing method according to the present embodiment is preferably 2.90 g·cm$^{-3}$ or more, and more preferably 3.00 g·cm$^{-3}$ or more and 3.20 g·cm$^{-3}$ or less.

When the true density of the composite material 100 is 2.90 g·cm$^{-3}$ or more, because there is less cavity in the interior of the composite material, lithium ion diffusion and charge transfer become better, and the output performance of the power storage device improves.

Also, if the true density of the composite material 100 is higher than 3.20 g·cm$^{-3}$, impurities such as vanadium pentoxide present in the composite material can cause decomposition reactions and dissolution precipitation of the electrolyte, thereby decreasing the reliability of the power storage device.

The true density of the composite material 100 can be measured, for example, by a gas pycnometer (manufacture by ULTRAPYC 1200e, Quantachrome Instruments).

The crystallite size of the composite material 100 obtained by the manufacturing method according to the present embodiment is preferably 55 nm or less, and more preferably 50 nm or less.

If the crystallite size of the composite material 100 is 55 nm or less, the output density of the power storage device can be increased.

For example, the crystallite size of the composite material 100 can be analyzed and calculated by the Pawley method using an X-ray diffraction device (D8 DISCOVER, manufactured by BrukerAXS) and using an analysis software (manufactured by TOPAS, BrukerAXS) from the diffraction line obtained in the range from 2θ=10 degrees to 90 degrees.

The powder resistance of the composite material 100 obtained by the manufacturing method according to the present embodiment is preferably 100 Ωcm or less, and more preferably 50 Ωcm or less. If the powder resistance of the composite material 100 is 100 Ωcm or less, a good conductive path is formed in the composite material 100, increasing the power density of the storage device. The powder resistance of the composite material 100 can be measured using, for example, a 1400 Celitest System (manufactured by Solatron Analytical) and a four-terminal sample holder (manufactured by Toyo Technica Co. Ltd.).

The concentration of vanadium in the coating layer made of the conductive carbon 103 of the composite material 100 obtained by the manufacturing method according to the present embodiment is preferably 5 at % or less.

If the concentration of vanadium in the coating layer of the conductive carbon 103 of the composite material 100 is 5 at % or less, the formation of a highly pure conductive carbon improves the output density of the power storage device.

The vanadium concentration in the coating layer of the conductive carbon 103 of the composite material 100 can be measured by EDX analysis using JEM-2100F (HR) (made by JEOL Ltd.).

<Method of Manufacturing Composite Material>

FIG. 2 illustrates an example of a flowchart diagram of a method of manufacturing a composite material 100 according to the present embodiment.

A method of manufacturing a composite material 100 according to the present embodiment includes, for example, a method of manufacturing a composite material including: a stirring process (S201) for adding a lithium source, a phosphate source, and a vanadium source as an active raw material, a conductive carbon or a conductive carbon precursor to a solvent, and heating and stirring the solvent for. 0.5 hours or more at 60° C. or more and 100° C. or less; a milling process (S202) for obtaining a solid object in a liquid, which is a slurry fluid, by performing wet milling for the object obtained in the stirring process, which is the product of the stirring process, using a media mill to make the median diameter of 0.2 μm to 1.0 μm and 1.0 μm; and a baking process (S204) for obtaining a composite material 100 by baking the milled object obtained by the milling process.

The solvent in the stirring process is not particularly limited as long as the solvent can dissolve a lithium source, a phosphate source, and a conductive carbon or a conductive carbon precursor. The solvent may be appropriately selected depending on the purpose, but the solvent is preferably an aqueous solvent having water as the main component in view of the solubility of the raw material.

When a solvent with low solubility of the raw material is used, some of the undissolved raw material is not used for chemical reactions. As a result, some raw materials that are not used in chemical reactions become impurities that hardly serve as active substances, thereby decreasing the output performance.

The sources of lithium in the stirring process include lithium organic acids such as lithium carbonate, lithium hydroxide, lithium oxide, lithium nitrate or lithium oxalate, which may be hydrates or anhydrides.

Examples of the phosphate source in the stirring process include phosphoric acid, polyphosphoric acid, phosphoric anhydride, ammonium dihydrogen phosphate, diammonium hydrogen phosphate, and ammonium phosphate.

For example, lithium source and phosphate source combinations are preferably lithium carbonate, which is a weak base, and phosphoric acid, which is a moderate acid. Lithium phosphate dissolves well by acidifying the aqueous solution.

Sources of vanadium in the stirring process include vanadium pentoxide, ammonium vanadate, vanadium oxyoxalate, and the like. Of these, vanadium pentoxide is preferred in that vanadium pentoxide provides a highly reactive composite precursor.

The active material may be not only lithium vanadium phosphate but also a raw material such as lithium iron phosphate, cobalt tritium phosphate, lithium manganese phosphate, nickel lithium phosphate, lithium titanate, silicone, and the like.

Examples of iron sources include iron chloride, iron phosphate, iron sulfate, iron carbonate, iron oxalate, iron acetate, iron lactate, iron particles and the like.

Sources of cobalt include cobalt nitrate and cobalt oxide.

Sources of manganese include manganese halide, manganese sulfate, manganese acetate, manganese carbonate and the like.

Examples of nickel sources include nickel oxide and the like.

Examples of titanium sources include meta-titanic acid, ortho-titanic acid, titanium oxide and the like.

As the conductive carbon in the stirring process, natural graphite, artificial graphite, carbon black such as acetylene black, ketchen black, channel black, furnace black, lamp black, thermal black, and the like, carbon fiber, fluorocarbon, graphene derivatives, and the like may be used.

The conductive carbon precursors in the stirring process include, for example, coal tar pitch from soft pitch to hard pitch; direct current heavy oil of coal-based heavy oil such as dry distillation liquid oil, atmospheric residual oil, decomposition heavy oil such as direct current heavy oil of vacuum residual oil, crude oil, ethylene tar, and the like, which is produced by-product during pyrolysis of crude oil, naphtha, and the like; aromatic hydrocarbons such as acenaphthylene, decacycline, anthracene, phenanthrene, and the like; polyphenylene such as phenazine, biphenyl, biphenyl, and the like; polyvinyl chloride; water-soluble polymers such as polyvinyl alcohol, polyvinyl butyral, polyethylene glycol, and the like, and insolubilized treatments thereof; nitrogen-containing polyacrylonitriles; organic polymers such as polypyrrole; organic polymers such as sulfur-containing polythiophene, polystyrene, and the like; natural polymers of sugar group such as glucose, fructose, lactose, maltose and sucrose; and thermosetting resin such as phenol-formaldehyde resin and imide resin. Among them, sugars are preferable because the sugars are inexpensive and easy to handle.

In the stirring process, a lithium phosphate aqueous solution is preferably prepared by adding a lithium source and a phosphoric acid source to a water-based solvent, followed by the addition of a vanadium source and a conductive carbon or a conductive carbon precursor.

After the lithium phosphate aqueous solution is prepared first, the vanadium source and the conductive carbon or the conductive carbon precursor are added to obtain a mild reaction that inhibits the exothermic reaction, thereby obtaining composite material 100 with the high true density.

The aqueous lithium phosphate solution in the stirring process may be prepared by dissolving a lithium source and a phosphate source in an aqueous solvent, or a commercially available aqueous lithium phosphate solution may be used.

That is, the stirring process may be a process of stirring a lithium source, a source of phosphoric acid, a source of vanadium, an electrically conductive carbon or a conductive carbon precursor in a solvent, or a process of stirring an aqueous lithium phosphate solution after adding a source of vanadium, an electrically conductive carbon or a conductive carbon precursor to the aqueous lithium phosphate solution.

The mixing proportion of the lithium source, the vanadium source, and the phosphate source in the stirring process may be adjusted so as to be a composition represented by a composition formula: $Li_3V_2(PO_4)_3$, that is, Li:V:P atoms=3: 2:3 (molar ratio).

In order to obtain a composite precursor having excellent reactivity, the median diameter of the milled object in the milling process is preferably not more than 2.0 µm, and the median diameter is more preferably not less than 0.2 and not more than 1.0 µm.

The median diameter of the milled object in the milling process can be measured by a laser confusion/diffraction method (Master Sizer 3000, manufactured by Malvarn Panalytical).

Although not required, a drying process (S203) for drying the milled object obtained in the milling process is preferably provided.

Further, the drying processing in the drying process is not particularly limited as long as the moisture in the milled object can be removed, but drying by spray drying is preferable because the composite material can be uniformly coated with the conductive carbon or the conductive carbon precursor.

When spray drying is used in the drying process, the solid concentration of the milled object can be adjusted. By adjusting the solid concentration of the milled object, the degree of agglomeration of the primary particles and the associated inter-particle cavities after the agglomeration can be controlled.

Preferably, the solid concentration of the milled object is not less than 15 mass % and not more than 30 mass %, and more preferably, the solid concentration is not less than 20 mass % and not more than 25 mass %.

When the solid concentration of the milled object is greater than 30 mass %, many primary particles aggregate, and many interparticulate cavities increase, resulting in a decrease in true density. If the solid concentration of the milled object is 30 mass % or less, the decrease in true density can be further reduced.

If the solid concentration of the milled object is less than 15 mass %, the coating layer of the conductive carbon becomes too thick, and lithium ion diffusivity decreases, thereby degrading output performance. If the solid concentration of the milled object is 20 mass % or more, the coating layer made of the conductive carbon can be inhibited from being too thick, and the deterioration of the output performance can be further inhibited.

The baking in the baking process is preferably a two-stage baking in which pre-baking is performed at the first temperature and then baking is performed at the second temperature not less than the first temperature.

Pre-baking removes impurities such as moisture and organic matter that can cause cavities in the material and oxidation of conductive carbon, and can obtain a high-density composite material 100 that is coated with highly pure conductive carbon. This allows good charge transfer at the electrode-electrolyte interface and can improve the output performance of the cell.

The pre-baking temperature in the baking process is preferably 100° C. or more and 500° C. or less, and more preferably 200° C. or more and 400° C. or less.

Moisture and organic components cannot be removed sufficiently when the baking temperature of the prebake is below 100° C. As a result, because the conductive carbon is oxidized and lithium vanadium phosphate cannot be formed with high purity and high true density in the later process of the baking process, the output characteristics decrease.

If the pre-baking temperature is 200° C. or higher, a composite material with higher output characteristics can be obtained because the pre-baking can further inhibit the oxidation of the conductive carbon and produce vanadium lithium phosphate with higher purity and true density.

If the pre-baking temperature is higher than 500° C., lithium vanadium phosphate is formed with insufficient removal of moisture and organic components. As a result, the purity and true density of vanadium lithium phosphate is reduced, which causes the decrease in output characteristics. Oxidation of the conductive carbon also decreases the output characteristics.

If the baking temperature of the pre-baking is 400° C. or less, it is possible to produce lithium vanadium phosphate having a higher purity and true density, and it is possible to reduce oxidation of the conductive carbon, thereby further suppressing the decrease in the output characteristic.

The pre-baking temperature increase rate in the baking process is preferably from T/4 to 2 T° C.·h$^{-1}$ when T=the pre-baking temperature. The pre-baking temperature increasing rate means the average rate from room temperature to the temperature of pre-baking.

When the rate of increase in temperature of the pre-baking exceeds 2T° C.·h$^{-1}$, the volatile component contained in the precursor of the composite material rapidly thermally expands. As a result, cracks or other defects occur in the composite material 100, and the true density of the composite material 100 decreases. The decreased true density prevents the movement of electrons and ions in the material, which causes the decrease in output performance. The conductive carbon precursors melt when the pre-baking temperature increasing rate is less than T/4° C. h$^{-1}$. As a result, the composite material 100 is unable to forma uniform conductive carbon 103 coating layer, and the charge transfer at the electrode-electrolyte interface degrades, and the output performance decreases.

The baking temperature in the baking process is preferably 600° C. or more and 1200° C. or less, and more preferably 1000° C. or less.

If the temperature is below 600° C., sufficient reaction energy cannot be obtained to form vanadium lithium phosphate. As a result, low-purity lithium vanadium phosphate is formed, which causes a decrease in output characteristics. In addition, because the conductive carbon precursor is not thermally decomposed, lithium vanadium phosphate is not sufficiently coated with the conductive carbon, which a decrease in output characteristics.

More pure vanadium lithium phosphate can be formed and more conductive carbon coated with vanadium lithium phosphate at a baking temperature of 800° C. or higher, and a composite material with higher output characteristics can be obtained because vanadium lithium phosphate can be more coated with the conductive carbon.

When the baking temperature is higher than 1200° C., the coating amount of the conductive carbon decreases, resulting in the generation of low purity vanadium lithium phosphate. As a result, the output characteristics decrease.

At a baking temperature of 1100° C. or less, a composite material with higher output characteristics can be obtained because a higher purity of vanadium lithium phosphate can be obtained.

The baking period of time in the baking process is preferably not less than 0.5 hours. The reaction energy required for the formation of vanadium lithium phosphate is insufficient if the baking period of time is less than 0.5 hours. This results in a low purity of vanadium lithium phosphate. In addition, because the conductive carbon precursor is not sufficiently pyrolyzed, the lithium vanadium phosphate is not sufficiently coated with the conductive carbon, resulting in a decrease in output characteristics.

Both the pre-baking and the baking are preferably performed in an atmosphere of an inert gas, such as $N_2$ or Ar, or under vacuum. $O_2$ and $H_2O$ can be removed under an inert gas or vacuum to cause a mild reaction, and the formation of a by-product such as $LiVOPO_4$ can be inhibited. In terms of heating efficiency, the pre-baking and the baking under an inert gas is more preferred.

Example

Hereinafter, examples of the present disclosure will be described, but the present disclosure is not limited to any of these examples.

The following evaluations were performed to confirm the condition of the composite material 100 manufactured by the manufacturing methods of each working example and each comparative example.

Working Example 1

—Stirring Process—

First, 3.7 L of distilled water was added to a 5 L beaker, and 261 g of lithium carbonate (FUJIFILM Wako Pure Chemical Industries, Ltd.) and 816 g of phosphoric acid (FUJIFILM Wako Pure Chemical Industries, Ltd.) were charged to obtain an aqueous solution of lithium phosphate by stirring the distilled water at room temperature (25° C.). Herein, 432 g of vanadium pentoxide (Taiyo Kogyo Co., Ltd.) and 246 g of sucrose (FUJIFILM Wako Pure Chemical Co., Ltd.) were added and stirred at 80° C., and a precipitation reaction was performed to obtain a reaction liquid containing a solid matter.

—Milling Process—

After the reaction liquid was cooled, a zirconia ball having a diameter of 0.5 mm was charged into a wet milling machine (LMZ015, manufactured by Ashizawa Finetech Ltd.), and the milling process was performed by a bead mill until the median diameter of the milled product in the reaction liquid was 0.7 µm or less, thereby obtaining a dispersion slurry containing the primary material 101.

—Drying Process—

The dispersed slurry was fed to a spray dryer having the temperature of the hot air inlet set to 150° C. to provide the secondary material 102.

—Baking Process—

The resulting secondary material was placed in an alumina pot, heated at a temperature increasing rate of 100° C.·h$^{-1}$ from 25° C. to 300° C. under a nitrogen (inert gas) atmosphere, and pre-baked at 300° C. for two hours. The temperature was then increased from 300° C. to 900° C. under the same conditions at a temperature increasing rate of 600° C.·h$^{-1}$, and was baked at 900° C. for 2 hours to obtain a composite material. The resulting composite material had a true density of 3.07 g·cm$^{-3}$.

Comparative Example 1

—Stirring Process—

First, 3.7 L of distilled water was added to a 5 L beaker, and 261 g of lithium carbonate (FUJIFILM Wako Pure Chemical Industries, Ltd.) and 816 g of phosphoric acid (FUJIFILM Wako Pure Chemical Industries, Ltd.) were charged to obtain an aqueous solution of lithium phosphate by stirring at room temperature (25° C.). Herein, 432 g of vanadium pentoxide (Taiyo Kogyo Co., Ltd.) and 246 g of sucrose (FUJIFILM Wako Pure Chemical Co., Ltd.) were added and stirred at 80° C., and a precipitation reaction was performed to obtain a reaction liquid containing a solid matter.

—Milling Process—

After the reaction liquid was cooled, a zirconia ball having a diameter of 0.5 mm was charged into a wet milling machine (LMZ015, manufactured by Ashizawa Finetech Ltd.), and the milling process was performed by a bead mill until the median diameter of the milled object in the reaction liquid became 0.7 µm or less, thereby obtaining a dispersion slurry containing the primary material 101.

—Drying Process—

The dispersed slurry was supplied to a spray dryer having the temperature of the hot air inlet set to 150° C. to provide the secondary material 102.

—Baking Process—

The resulting secondary material was placed in an alumina pan, and the temperature was increased at a temperature increasing rate of 600° C.·h$^{-1}$ from 25° C. to 900° C. under a nitrogen (inert gas) atmosphere, and then baked at 900° C. for 2 hours to obtain a composite material. The resulting composite material had a true density of 2.94 g·cm$^{-3}$.

TABLE 2

| | TRUE DENSITY/g · cm$^{-3}$ |
|---|---|
| WORKING EXAMPLE 1 | 3.07 |
| COMPARATIVE EXAMPLE 1 | 2.94 |

The results in Table 2 shows the following facts with respect to a method of manufacturing a composite material 100 containing at least lithium vanadium phosphate 104 and conductive carbon 103.

When comparing Working Example 1 with Comparative Example 1, Table 2 indicates that the composite material obtained by the manufacturing method of Working Example 1 including the two-stage baking for pre-baking has a higher true density than the composite material obtained by the manufacturing method of Comparative Example 1. This is thought to be due to the removal of impurities such as moisture and organic matter, which can cause cavities in the material, by pre-baking. By removing the impurities, a composite material coated with highly pure conductive carbon can be obtained.

The disclosed technique can provide a method of making a composite material that is truly dense and has high output characteristics.

Although the preferred embodiments have been described in detail above, various modifications and substitutions can be applied to the embodiments described above without departing from the scope of the claims.

What is claimed is:

1. A composite material, comprising:
vanadium lithium phosphate; and
a coating layer including conductive carbon and vanadium, wherein
the conductive carbon is present in the coating layer at 4.0 mass % or more and 7.5 mass %, and
the vanadium is present in the coating layer at 5 at % or less as measured by energy dispersive X-ray analysis.

2. The composite material as claimed in claim 1, wherein a true density of the composite material is 2.90 g·cm$^{-3}$ or more.

3. The composite material as claimed in claim 1, wherein a crystallite size of the composite material is 55 nm or less.

4. The composite material as claimed in claim 1, wherein the vanadium lithium phosphate is expressed by a chemical formula $Li_3V_2(PO_4)_3$ or a general formula $Li_xV_{2-y}M_y(PO_4)_z$, wherein x, y and z satisfy $0<x\leq 3$, $0\leq y<2$, and $2\leq z\leq 3$, respectively, and M is at least one selected from the group consisting of Fe, Co, Mn, Cu, Zn, Al, Sn, B, Ga, Cr, V, Ti, Mg, Ca, Sr, Zr, Nb, Y, Na, and W.

5. The composite material as claimed in claim 1, wherein the composite material is an additive for a power storage device.

6. An electrode containing the composite material as claimed in claim 1.

7. An electrode device, comprising:

a positive electrode;

a negative stacked over the positive electrode while being electrically insulated from the positive electrode, wherein the positive electrode is made of the electrode as claimed in claim 6.

8. A power storage device, comprising:

a positive electrode;

a negative electrode electrically insulated from the positive electrode; and an electrolyte, wherein the positive electrode is made of the electrode as claimed in claim 6.

9. A method of manufacturing a composite material containing an active material and a conductive carbon, comprising:

preparing a lithium phosphate aqueous solution;

adding a vanadium source and at least one of a conductive carbon and a conductive carbon precursor to the lithium phosphate aqueous solution;

stirring the vanadium source and the at least one of the conductive carbon and the conductive carbon precursor in the lithium phosphate aqueous solution;

milling a resulting object obtained by the stirring step, thereby obtaining a milled object;

pre-baking the milled object at a first temperature; and baking the milled object at a second temperature higher than the first temperature, wherein the pre-baking and the baking are performed in a same chamber to form a composite material that comprises vanadium lithium phosphate, and a coating layer that includes conductive carbon and vanadium, the conductive carbon being present in the coating layer at 4.0 mass % or more and 7.5 mass %, and the vanadium being present in the coating layer at 5 at % or less as measured by energy dispersive X-ray analysis.

10. The method as claimed in claim 9, wherein the first temperature in the pre-baking step is 100° C. or higher and 500° C. or lower.

11. The method as claimed in claim 9, wherein a temperature increasing rate of the pre-baking step is $T/4°$ C.·h$^{-1}$ or higher and $2T°$ C.·h$^{-1}$ or lower when the first temperature is made T.

12. The method as claimed in claim 9, further comprising:

drying the milled object obtained in the milling step, wherein the baking step comprises baking the dried milled object in the drying step.

13. The method as claimed in claim 12, wherein a concentration of a solid matter of the milled object in the drying step is 15 mass % or more and 30 mass % or less.

14. The method as claimed in claim 9, wherein the solvent in the stirring step contains water as a principal component.

15. The method as claimed in claim 9, wherein the active material is lithium vanadium phosphate.

16. The method as claimed in claim 15, wherein the stirring step comprises stirring a source of lithium, a source of phosphate, a source of vanadium, a conductive carbon or a conductive carbon precursor in the solvent.

17. The method as claimed in claim 15, wherein the stirring step comprises adding a source of vanadium, and one of the conductive carbon and the conductive carbon precursor to an aqueous lithium phosphate solution, and then stirring the aqueous lithium phosphate solution.

18. A method of manufacturing a composite material containing an active material and a conductive carbon, comprising:

preparing a lithium phosphate aqueous solution;

adding a vanadium source and at least one of a conductive carbon and a conductive carbon precursor to the lithium phosphate aqueous solution;

stirring the vanadium source and the at least one of the conductive carbon and the conductive carbon precursor in the lithium phosphate aqueous solution;

milling a resulting object obtained by the stirring step, thereby obtaining a milled object;

pre-baking the milled object at a first temperature; and baking the milled object at a second temperature higher than the first temperature, wherein the pre-baking and the baking are performed in a same chamber to form a composite material that comprises vanadium lithium phosphate, and a coating layer that includes conductive carbon and vanadium, the conductive carbon being present in the coating layer at 4.0 mass % or more and 7.5 mass %, and the vanadium being present in the coating layer at 5 at % or less as measured by energy dispersive X-ray analysis.

19. The composite material as claimed in claim 1, wherein the composite material has a powder resistance of 100 Ωcm or less.

* * * * *